US010445687B2

(12) United States Patent
Levy

(10) Patent No.: US 10,445,687 B2
(45) Date of Patent: Oct. 15, 2019

(54) METHOD AND SYSTEM FOR IMPLEMENTING ELECTRONIC STORAGE AREAS

(71) Applicant: Luxer Corporation, Sacramento, CA (US)

(72) Inventor: Arik Seth Levy, Sacramento, CA (US)

(73) Assignee: Luxer Corporation, Sacramento, CA (US)

( * ) Notice: Subject to any disclaimer, the term of this patent is extended or adjusted under 35 U.S.C. 154(b) by 359 days.

(21) Appl. No.: 14/668,883

(22) Filed: Mar. 25, 2015

(65) Prior Publication Data

US 2016/0098679 A1 Apr. 7, 2016

Related U.S. Application Data

(63) Continuation-in-part of application No. 14/505,457, filed on Oct. 2, 2014.

(51) Int. Cl.
*G06Q 10/08* (2012.01)
*G06F 16/583* (2019.01)

(52) U.S. Cl.
CPC ....... *G06Q 10/0836* (2013.01); *G06F 16/583* (2019.01); *G06Q 10/087* (2013.01)

(58) Field of Classification Search
CPC ......... G06Q 20/04; G06K 9/00; G06F 19/323
USPC .............. 705/28, 21; 382/101; 235/386, 379
See application file for complete search history.

(56) References Cited

U.S. PATENT DOCUMENTS

| | | |
|---|---|---|
| 4,348,967 A | 9/1982 | Schattner et al. |
| 4,971,244 A | 11/1990 | Friedman |
| 5,329,659 A | 7/1994 | Reinert, Sr. |
| 5,339,353 A | 8/1994 | Asahara et al. |
| 5,666,493 A | 9/1997 | Wojcik et al. |
| 5,696,906 A | 12/1997 | Peters et al. |
| 5,875,430 A | 2/1999 | Koether |
| 5,959,275 A | 9/1999 | Hughes et al. |
| 5,962,834 A | 10/1999 | Markman |
| 6,010,239 A | 1/2000 | Hardgrave et al. |
| 6,085,168 A | 7/2000 | Mori et al. |
| 6,199,755 B1 | 3/2001 | Matsumoto et al. |
| 6,236,332 B1 | 5/2001 | Conkright et al. |

(Continued)

OTHER PUBLICATIONS

Title: "Laundry Locker on KRON 4 with Gabe Slate", Posting Date: Sep. 26, 2007, Site Name: Youtube.com, URL: http://www.youtube.com/watch?v=2-qChq7VSSs (A CD containing the video is attached).

(Continued)

*Primary Examiner* — Vanel Frenel
(74) *Attorney, Agent, or Firm* — Bowen Liu; Jennifer A. Haynes; David Lewis

(57) ABSTRACT

In an embodiment, articles such as items are left in storage areas in a storage bank by delivery service. A delivery service selects the intended recipient from a list of intended recipients. If the intended recipient is not found on the list, information about the intended recipient (e.g. a photo of the mailing label or other information) is entered into the system, and a message having the information is left in a house account. In response, a message is received having additional information about the intended recipient, which is used to contact the intended recipient and request the intended recipient to pick up the item.

33 Claims, 24 Drawing Sheets

(56) References Cited

U.S. PATENT DOCUMENTS

| | | | |
|---|---|---|---|
| 6,285,986 B1 | 9/2001 | Andrews | |
| 6,321,202 B1 | 11/2001 | Raveis, Jr. | |
| 6,377,296 B1 | 4/2002 | Zlatsin et al. | |
| 6,428,382 B1 | 8/2002 | Randolph | |
| 6,470,303 B2 | 10/2002 | Kidd et al. | |
| 6,611,598 B1* | 8/2003 | Hayosh | G06Q 20/042 380/54 |
| 6,662,078 B1 | 12/2003 | Hardgrave et al. | |
| 6,690,997 B2 | 2/2004 | Rivalto | |
| 6,775,774 B1* | 8/2004 | Harper | G06F 19/323 235/386 |
| 6,859,722 B2 | 2/2005 | Jones | |
| 6,866,195 B2 | 3/2005 | Knowles et al. | |
| 6,882,269 B2 | 4/2005 | Moreno | |
| 6,961,711 B1 | 11/2005 | Chee | |
| 6,974,077 B1 | 12/2005 | Beyder et al. | |
| 6,985,871 B2 | 1/2006 | Simon et al. | |
| 6,999,825 B2 | 2/2006 | Inomata | |
| 7,013,289 B2 | 3/2006 | Horn et al. | |
| 7,055,741 B2 | 6/2006 | Bong et al. | |
| 7,107,457 B2* | 9/2006 | Harper | G06F 19/323 235/382.5 |
| 7,233,907 B2 | 6/2007 | Young | |
| 7,252,227 B2 | 8/2007 | Chase | |
| 7,313,530 B2 | 12/2007 | Smith et al. | |
| 7,315,616 B2 | 1/2008 | Annadata et al. | |
| 7,364,069 B2 | 4/2008 | Chase | |
| 7,366,586 B2 | 4/2008 | Kaplan et al. | |
| 7,636,671 B2 | 12/2009 | Caveny et al. | |
| 7,664,567 B2 | 2/2010 | Ishida | |
| 7,720,712 B1* | 5/2010 | Allocca | G06Q 20/203 235/379 |
| 7,765,131 B2 | 7/2010 | Klingenberg et al. | |
| 7,844,507 B2 | 11/2010 | Levy | |
| 7,860,738 B2 | 12/2010 | Simon et al. | |
| 7,886,971 B2 | 2/2011 | Cassady et al. | |
| 8,108,259 B2 | 1/2012 | Klingenberg et al. | |
| 8,290,878 B2 | 10/2012 | Taylor | |
| 8,359,249 B2 | 1/2013 | Levy | |
| 8,401,932 B2 | 3/2013 | Levy | |
| 8,725,600 B2 | 5/2014 | Levy | |
| 2002/0046133 A1 | 4/2002 | Sheth | |
| 2002/0118095 A1 | 8/2002 | Estes | |
| 2002/0184114 A1 | 12/2002 | Jorgensen | |
| 2003/0035520 A1 | 2/2003 | Cannon et al. | |
| 2004/0174392 A1 | 9/2004 | Bjoernsen et al. | |
| 2004/0243426 A1 | 12/2004 | Hashimoto | |
| 2004/0254802 A1 | 12/2004 | Miller et al. | |
| 2005/0190037 A1 | 9/2005 | Shitan et al. | |
| 2006/0069601 A1 | 3/2006 | Simon et al. | |
| 2006/0271437 A1 | 11/2006 | Maggio | |
| 2007/0035763 A1 | 2/2007 | Bard et al. | |
| 2007/0251990 A1 | 11/2007 | LeNorman | |
| 2007/0252000 A1 | 11/2007 | LeNorman | |
| 2007/0283986 A1 | 12/2007 | Baum | |
| 2008/0106368 A1 | 5/2008 | Vitier | |
| 2008/0247629 A1* | 10/2008 | Gilder | G06Q 20/04 382/137 |
| 2009/0271207 A1 | 10/2009 | Lanigan et al. | |
| 2011/0035230 A1 | 2/2011 | Levy | |
| 2012/0062362 A1 | 3/2012 | Rudduck et al. | |
| 2012/0235786 A1 | 9/2012 | Rudduck et al. | |
| 2013/0144428 A1* | 6/2013 | Irwin | B65G 1/0485 700/218 |
| 2013/0166067 A1 | 6/2013 | Irwin et al. | |
| 2014/0297487 A1 | 10/2014 | Bashkin | |
| 2015/0107316 A1 | 4/2015 | Kirkjan | |
| 2015/0221160 A1* | 8/2015 | Graef | G07D 11/0096 235/379 |
| 2015/0339862 A1* | 11/2015 | Skaaksrud | G06K 9/00 382/101 |
| 2016/0098678 A1 | 4/2016 | Levy | |
| 2016/0335595 A1 | 11/2016 | Levy et al. | |

OTHER PUBLICATIONS

Title: "Garde-Robe", Site Name: Garde Robe: New York's Unlimited Closet Space, Garde Robe web site pages cited in U.S. Appl. No. 11/386,528, filed Oct. 9, 2009, pp. 9.

Title: "American Drycleaner", Publisher: Sycamore System Publication, ISSN No. 0002-8258, 71,4,35(28), Jul. 2004, pp. 17.

Title: "Couples, get your own e-mail accounts!", Date: Mar. 13, 2004, Published by: Mary Elizabeth Williams, URL: web.archive.org/web/20140313014527/http://www.salon.com/2014/02/12/couples_get_your_own_email_accounts/.

Title: "The hidden life saver?—Unattended locker box logistics for faster and more efficient hospital supply," Author: Gavin Bailey, et al, Date Submitted: Jul. 11, 2012, TRB 2013 Annual Meeting, URL: https://eprints.soton.ac.uk/348563/1/2013%2520%255B60%255D%2520Locker%2520Boxes%2520TRB.pdf, pp. 12.

Title: "Hostel Jobs Worldwide: 347 Hostels & Guest Houses Open to Volunteer Work Exchanges—Part 2: North and South America, Australia and New Zealand," Print Date: Jul. 23, 2018, Posting Date: May 3, 2018, Site Name: the-working-traveller.com, URL: https://web.archive.org/web/20140503204619/http://www.the-working-traveller.com/hostel-jobs-worldwide-347-hostels-guest-houses-open-to-volunteer-work-exchanges-part-2-north-and-south-america-australia-and-new-zealand/, pp. 13.

Title: "Jacksonville Linen Attendant I job on JacksonvilleHelpWanted.com," Print Date: Aug. 27, 2008, Posting Date: Aug. 26, 2008, Site Name: regionalhelpwanted.com, URL: http://regionalhelpwanted.com/Search/detail.cfm?SN=37&ID=16872088&jexp=2, pp. 1.

Title: "Job Detail," Print Date: Aug. 27, 2008, Posting Date: Aug. 18, 2008, Site Name: fortress.wa.gov, URL: https://fortress.wa.gov/esd/worksource/ShowJobDetail.aspx?JobID=1411983&SearchID=325388200&Sort=&Direction=&PageSize=25&PageIndex=3&RecordCount=1242&Sender=Employment, pp. 1.

Title: "Jobscience—Linen Attendant I," Print Date: Aug. 27, 2008, Posting Date: Aug. 13, 2008, Site Name: jobs.jobscience.com, URL: http://jobs.jobscience.com/JsrApp/index.cfm?cmd=showPositionDetail&positionID=471116&cobrandId=9000&masterId=SEGHS001&accountId=3964CB25-B8CD-AB83-60479DAD2C68E108&prodApp=CC153C84-AFOB-4F17-A32A-75AEC3B65159, pp. 3.

Title: "Laundry and Dry-Cleaning Workers—51/6011.00," Print Date: Aug. 27, 2008, Site Name: dwdonenet.in.gov, URL: http://dwdonenet.in.gov/seekers.htm?onetCode=51-6011.00, pp. 1.

Title: "Laundry service by the locker—Springwise," Print Date: Feb. 17, 2009, Publication Date: Sep. 8, 2008, Site Name: Springwise.com, URL: http://www.springwise.com/life_hacks/laundry_service_by_the_locker/, pp. 2.

Title: "SFAA | Laundry Locker: A Fresh Look at Laundry Delivery | by Emily Landes," Publication Date: May 2006, Print Date: Apr. 23, 2019, Site Name: sfaa.org, URL: https://web.archive.org/web/20160305234925/http://sfaa.org/0605landes.html, pp. 4.

Title: "2008 | This year's top 10 life hack business ideas," Print Date: Feb. 17, 2009, Publication Date: Dec. 30, 2008, Site Name: Springwise.com, URL: http://springwise.com/life_hacks/2008_this_years_top_10_life_hab/,pp. 2.

* cited by examiner

FIG. 19

METHOD AND SYSTEM FOR IMPLEMENTING ELECTRONIC STORAGE AREAS

CROSS-REFERENCE TO RELATED APPLICATIONS

This application is a Continuation-in-Part of application Ser. No. 14/505,457, entitled "METHOD AND SYSTEM FOR IMPLEMENTING ELECTRONIC STORAGE AREAS," filed Oct. 2, 2014, which is incorporated herein by reference.

The following commonly owned United States patents, including the present Application, are related to each other. Each of the other Patents are incorporated by reference herein in its entirety:

U.S. Pat. No. 7,844,507, entitled "HANDLING HOUSEHOLD TASKS," by Arik Seth Levy, filed Mar. 22, 2006;

U.S. Pat. No. 8,401,932, entitled "HANDLING HOUSEHOLD TASKS," by Arik Seth Levy, filed Oct. 18, 2010;

U.S. Pat. No. 8,359,249, entitled "STORAGE LOCKER," by Arik Seth Levy, filed Aug. 28, 2011; and U.S. Pat. No. 8,725,600, entitled "STORAGE LOCKER," by Arik Seth Levy, filed Dec. 20, 2012.

FIELD

The current specification relates to accessing storage areas.

BACKGROUND

The subject matter discussed in the background section should not be assumed to be prior art merely as a result of its mention in the background section. Similarly, a problem mentioned in the background section should not be assumed to have been previously recognized in the prior art. The subject matter in the background section merely represents different approaches to accomplishing various tasks.

Typically, use of a service through a web interface requires prior registration or account setup with the service provider. This specification recognizes issues in deliveries and pickups.

BRIEF DESCRIPTION OF THE FIGURES

In the following drawings like reference numbers and labels are used to refer to the same elements. Although the following figures depict various examples of inventions associated with this specification, the inventions associated with this specification are not limited to the examples depicted in the figures.

FIG. 19 is a screenshot of an example of a page for the delivery service to select an option to indicate that a signature is required and to choose the size of storage area to deposit the item;

DETAILED DESCRIPTION

Although the issues discussed in the background or elsewhere may have motivated some of the subject matter disclosed below, nonetheless, the embodiments disclosed below do not necessarily solve all of the problems associated with the subject matter discussed in the background or elsewhere. Some embodiments only address one of the problems, and some embodiments do not solve any of the problems associated with the subject matter discussed in the background or elsewhere.

In general, at the beginning of the discussion of each of FIGS. 1-5 is a brief description of each element. After the brief description of each element, each element is further discussed, usually in numerical order, but there is no one location where all of the information of any element of FIGS. 1-9 is necessarily located. Unique information about any particular element or any other aspect of any of FIGS. 1-9 may be found in, or implied by, any part of the specification.

In various places in discussing the drawings a range of letters, such as a-m or a-n are used to refer to individual elements of various series of elements that are the same. In each of these series, the ending letters are integer variables that can be any number. Unless indicated otherwise, the number of elements in each of these series is unrelated to the number of elements in others of these series. Specifically, even though one letter (e.g. "m") comes earlier in the alphabet than another letter (e.g., "n"), the order of these letters in the alphabet does not mean that the earlier letter represents a smaller number. The value of the earlier letter is unrelated to the later letter, and may represent a value that is greater than, the same as, or less than the later letter. The ellipses in the figures, which may be located between any two items, indicate that any number of similar items may be included between those two items.

Figure 1:
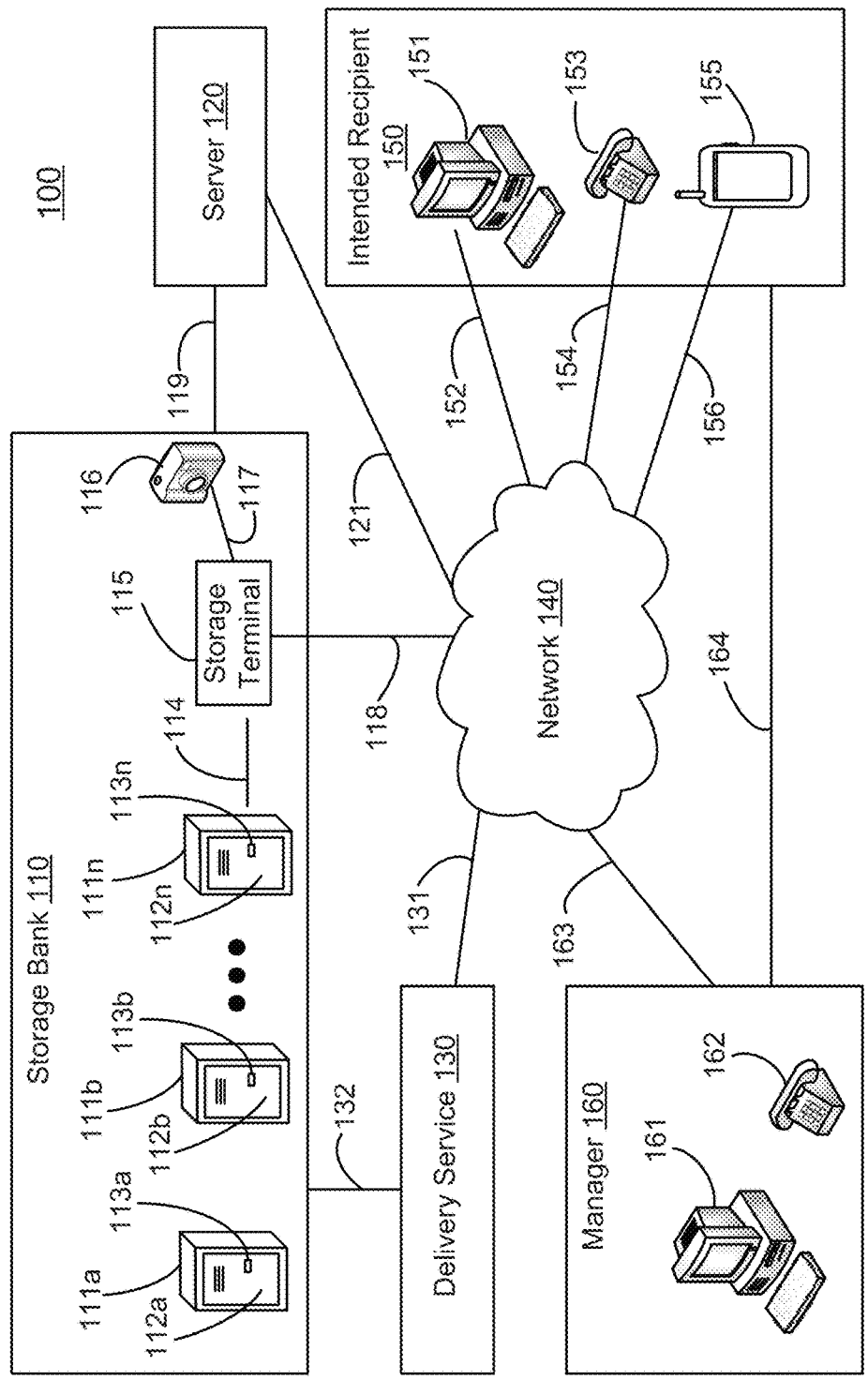
FIG. 1 shows a block diagram of an embodiment of a system used for managing a set of storage areas for delivery services and pickups.

FIG. 1 shows a block diagram of an embodiment of a system 100 used for managing a set of storage areas for delivery services and pickups. In at least one embodiment, system 100 includes at least a storage bank 110, which includes at least a plurality of storage areas 111a-n that has at least doors 112a-n and locks 113a-n, line 114, a storage terminal 115, a camera 116, and lines 117, 118 and 119. System 100 also includes at least a server 120, line 121, a delivery service 130, lines 131 and 132, a network 140, intended recipient 150, an intended recipient terminal 151, line 152, a phone 153, line 154, a mobile terminal 155, line 156, a manager 160, a manager terminal 161, a phone 162, and lines 163 and 164. In other embodiments, system 100 may not include all of the components listed and/or may include other components in addition to or instead of those listed above.

FIG. 1 illustrates examples of a network associated with system 100 via which an item(s) may be delivered and/or picked up. In this specification the words "item" and "package" are used interchangeably. The words "item" and "package" may be substituted one for another to obtain different embodiments. In system 100, delivery service may deposit an item for an intended recipient in one of the storage areas in a storage bank. In an embodiment, the delivery service may search for information about the intended recipient via a storage terminal that is connected to a server. If the intended recipient has been registered in the system 100, the information about the intended recipient is found in the server and optionally the storage terminal assigns and/or opens a storage area for the delivery service to deposit the item. Alternatively, the delivery service chooses any storage area that is not currently in use, and the storage terminal may detect and/or information may be entered into the storage terminal informing the storage terminal which locker was chosen. In an embodiment, the storage terminal or the server may generate a password and notify the intended recipient to pick up the item from the same storage area using the password. Throughout this specification, the terms password, key code, access code, and entry code are used interchangeably—any of these terms may be substituted for any of the others to obtain a different embodiment. In another embodiment, if the intended recipient is unregistered and/or cannot be found in the system 100 (i.e. unlisted in search results returned by the server), the delivery service may photograph the mailing label and/or input the information about the intended recipient, via the storage terminal for uploading to the server, so that the server may contact a manager with a house account to obtain information about the intended recipient stored in a manger terminal, and/or subsequently register the intended recipient. Optionally, either the server or the manager may notify the intended recipient to pick up the item from the storage area in the storage bank.

In an embodiment of system 100, it is possible to first deposit the item in a storage area, and then later establish an account and/or inform an intended recipient that his/her item is in a storage area waiting to be picked up. In this specification, the term "delivery service" is generic to an employee of a delivery service company or a delivery person, because by virtue of being employed by the delivery services company the employee may need to go to the storage bank to deliver or deposit items. In this specification, the term "manager" is generic to an employee of the managing office, a person in charge of the house account, or an electronic managing system or administrative server, because either the employee or person may view and identify information about the intended recipient, or the managing system may automatically identify and locate the intended recipient, when the intended recipient is not registered in the system 100. The terms "customer," "recipient," "intended recipient," and "user" may be substituted one for the other in this specification to obtain different embodiments.

Storage bank 110 is a location or facility that includes a plurality of storage areas for securely storing articles that may be accessible by authorized entities or persons. In at least one embodiment, storage bank 110 may be a locker bank that includes a number of lockers, each of which has a physical lock or an electronic lock controlled by an electronic system. Optionally storage bank 110 may be free for the users to use, or may charge fees (e.g., a one-time fee for each use, a monthly or yearly rental fee, a membership fee, etc.). Optionally the storage bank 110 may include customer service representatives, maintenance persons, and/or technical staff, for assisting the customers, answering questions, dealing with problems, managing the storage bank 110, and/or handling technical issues. In at least one embodiment, the storage bank 110 may be accessible by different entities. For example, a delivery person from a delivery service company may drop off an item in one of the storage areas, and later an intended recipient may pick up the item from the same storage area. In another embodiment, the storage bank 110 is owned and/or used by the same entity or person. For example, storage bank 110 may be owned and used by a company for distributing or storing items of the employees of the company. The storage bank 110 may provide different levels and/or methods of security. For example, a user may possess a key or password to lock and open a storage area in the storage bank 110. In another example, a user may use a code received from a server, a manager, or delivery service to open the storage area.

In at least one embodiment, storage bank 110 is partially or entirely controlled by an electronic system that includes at least a storage terminal for managing and controlling the storage areas. For example, an intended recipient may use the storage terminal to access the storage areas in the storage bank 110. In another embodiment, storage bank 110 may be managed or operated online, optionally via a user interface. In at least one embodiment, the storage bank 110 is communicatively connected to a network and/or a server.

In at least one embodiment, storage bank 110 locates in a public place and/or within an area (e.g., a pickup radius) of a public place, such as an apartment building, an office building, a school, a campus, a facility, etc. In at least one embodiment, storage bank 110 has its own building or shelter, or is located inside an apartment building, an office building, a school building, etc. In at least one embodiment, multiple entities or buildings may share one storage bank 110, which is located in a pickup radius of the multiple entities or buildings. In another embodiment, more than one storage bank 110 may be located in the same building, optionally for serving different entities or companies. In at least one embodiment, the system 100 includes multiple storage banks, and each may be located a different location, for properly serving intended recipients residing or working at different locations. In other embodiments, storage bank 110 may include other structures or devices.

Storage areas 111a-n are secured storage compartments or spaces in storage bank 110 for temporarily holding or storing articles or items, and may be accessible by both delivery services and intended recipients. In an embodiment, storage areas 111a-n may be lockers. In another embodiment, storage areas 111a-n may be any receptacle, such as bins, cages, baskets, containers, and/or bags (in this specification, the word receptacle is generic to a locker and any other container). In at least one embodiment, storage areas 111a-n may include receptacles with walls made from materials such as steel, wood, laminate, plastic, etc. In at least one embodiment, the receptacles of storage areas 111a-n are physically joined together side by side, optionally sharing walls with one another. In at least one embodiment, the receptacles of storage areas 111a-n are arranged in rows and/or tiers, and may include multiple rows and/or tiers. In another embodiment, storage areas 111a-n include different sizes and/or shapes. In at least one embodiment, storage areas 111a-n all have the same size and/or shape. In at least one embodiment, each of the storage areas 111a-n may include a storage identifier (e.g., a storage area number) for identifying the storage area. The storage identifier may also be useful in locating and/or tracking items that being delivered or waiting to be picked up. In at least one embodiment, each of storage areas 111a-n may include a door with a lock mechanism for securely fastening the door. In other embodiments, storage areas 111a-n may be in various shapes, numbers, sizes, and/or materials.

In at least one embodiment, the storage areas 111a-n are not assigned to specific intended recipients or accounts. In at least one embodiment, delivery service delivers an item(s) associated with an intended recipient or an account and leaves the item delivered in one of the storage areas 111a-n, which is secured by a lock mechanism. The item remains in the selected one of storage area 111a-n, secured by the lock mechanism, until the item is later picked up by an authorized intended recipient. In at least one embodiment, after the item is picked up from one of the storage areas 111a-n, the same storage area is ready to be reused, and may store items for other intended recipients. In an embodiment, items associated with one intended recipient or one account may be delivered into multiple storage areas 111a-n.

In an alternative embodiment, each of storage areas 111a-n may be assigned to an intended recipient and/or an account. In an embodiment, each of storage areas 111a-n is secure in the sense that only the user and the delivery service have authorized access. After one of storage areas 111a-n is already in use, others desiring access to the same storage area, since they are not authorized to have access, are expected to be required to defeat at least one security device, such as by breaking the storage area, picking a lock, and/or breaking a code. In an embodiment, storage areas 111a-n may be associated with (e.g., owned, rented, and/or managed by) a delivery company. In an alternative embodiment, one or more of storage areas 111a-n may be managed by another party (e.g., the manager of the apartment building or office building where the storage bank 110 is located, a laundry service, or a household services company).

Doors 112a-n are structures that serve to block off, and allow access to, an entrance to storage areas 111a-n. In at least one embodiment, doors 112a-n includes at least a panel that swings on hinges or that slides or spins inside of storage areas 111a-n. In at least one embodiment, doors 112a-n connect to the receptacles of the storage areas on one side, while the opposite or other sides include, or are connected to, lock mechanisms for locking the doors 11a-n. In at least one embodiment, doors 112a-n include ventilation structures (e.g., a series of horizontal angled slats at the top or bottom of the doors 112a-n) to provide for the flow of air to aid in cleanliness. In at least one embodiment, doors 112a-n include springs or other mechanical structures that mechanically bias the doors 112a-n to closed position, so that doors 112a-n may close by themselves after the items are dropped off or picked up. In other embodiments, doors 112a-n may include door handles or other structures.

Locks 113a-n are fastening devices for locking storage areas 111a-n, respectively. Locks 113a-n may be any sort of locks including, but not limited to, electronic locks that accepts code or password, locks that receive physical objects (e.g., keys, keycards, fingerprints, RFID cards, security tokens, etc), or of any combination. In at least one embodiment, locks 113a-n locks storage areas 111a-n, respectively, when the storage areas 111a-n are not in use. In another embodiment, locks 113a-n are left open when the storage areas 111a-n are not in use. In at least one embodiment, locks 113a-n may be mounted to the doors 112a-n or to the receptacle walls of storage areas 111a-n. In at least one embodiment, locks 113a-n include keypads and/or screens that allow a user to enter key code or password, and/or to access system 100. In at least one embodiment, when the key code or password that was entered by the user matches the predetermined key code or password, the locks 113a-n are opened and the storage areas 111a-n are available for use. In at least one embodiment, locks 113a-n may be automatically locked when the doors 112a-n are closed, or may include a button or mechanism to lock or to confirm that the locks 113a-n are locked. In another embodiment, locks 113a-n are electronically controlled by a storage terminal or a server, which may include a lock interface that sends signals to each of locks 113a-n for controlling locking or opening of locks 113a-n. In at least one embodiment, the user may select a storage area and enter key code or password using a storage terminal, and the storage terminal or server may compare to determine whether the key code or password entered matches predetermined key code or password for that storage area. If matched, the storage terminal or server sends a signal to open the lock of the selected storage area. In at least one embodiment, the storage terminal or server receives a request to open or lock one or more of the locks 113a-n and sends signals to the selected locks for controlling the opening or locking the locks.

Line 114 communicatively links the locks 113a-n to a storage terminal for controlling the locks 113a-n. In at least one embodiment, line 114 includes physical cable or wires, or wireless connections. In at least one embodiment, line 114 connects each of the locks 113a-n to a lock interface that is controlled by the storage terminal.

Storage terminal 115 is a terminal for managing and/or controlling access to storage areas 111a-n of storage bank 110, and/or assisting deliveries and pickups. In at least one embodiment, storage terminal 115 may be a standalone device, a device mounted to a wall of storage bank 110, or a device being a portion of, or connected to, the receptacles of storage areas 111a-n. In at least one embodiment, storage terminal 115 includes at least a computer system and/or a user interface for communicating with delivery service and intended recipients and handling deliveries and/or pickups. In at least one embodiment, storage terminal 115 includes multiple computer systems communicatively connected to one another, one at each row of storage areas 111a-n or at different locations for the convenience of users. In at least one embodiment, storage terminal 115 is communicatively connected to each of the locks 113a-n for sending signals to and/or receiving from the lock of each of the storage areas 111a-n. In at least one embodiment, storage terminal 115 sends signals to one of the locks 113a-n to open or lock the electronic lock, for allowing both delivery service and the intended recipient to access the same storage area in a secured way. In at least one embodiment, storage terminal 115 is communicatively connected to a network that allows the storage terminal 115 to communicate with a server, a delivery service, an intended recipient, and/or a manager.

In at least one embodiment, storage terminal 115 allows delivery service to access the system 100 and search for an intended recipient to deliver an item. Optionally the delivery service is registered to the system 100 and/or receives an access code, and may enter the access code at the storage terminal to access system 100. In at least one embodiment, storage terminal 115 includes an application with a user interface that presents a page to the delivery service, via which the delivery service 130 may enter information about an intended recipient to search for intended recipients. In at least one embodiment, storage terminal 115 shows a list of returned, unclaimed, or unretrieved items for the delivery service to collect and return to the vendors. In at least one embodiment, storage terminal 115 shows a list of available storage areas that have different sizes, and presents fields to the delivery service for choosing a size of storage area for dropping off the item. In at least one embodiment, storage terminal 115 provides an option for the delivery service to decide whether a signature is required prior to unlocking the storage area for the intended recipient to pick up. In at least one embodiment, the storage terminal 115 assigns a storage location that is not currently in use, and/or generate a password (or key code) that may be used by the intended recipient to access the storage area. In at least one embodiment, the access code is different from the password (or key code) in that the access code is assigned to the delivery service for accessing the system 100 and may remain unchanged whenever the delivery service deposits various items to the storage areas 111a-n, while the password is generated once when an item is dropped off in one of the storage areas 111a-n for an intended recipient to open the lock to the one storage area and may expire thereafter. In at least one embodiment, the system 100 may generate different passwords for each different use of the same storage area(s) 111a-n. In at least one embodiment, storage terminal 115 presents a field to the intended recipient for entering the password and/or signature, and then authenticates the intended recipient prior to allowing the intended recipient to pick up the item. In at least one embodiment, storage terminal 115 includes a pad or touch screen for the intended recipient to sign. In at least one embodiment, storage terminal 115 communicates with the server to record and manage information about intended recipients, items, and/or storage areas 111a-n. If an intended recipient is not registered or not found in the system 100, storage terminal 115 allows and/or instructs the delivery service to photograph a mailing label of the item via a camera that is communicatively linked to the storage terminal 115, and then upload the photograph to the server.

Camera 116 is a camera for taking photos of mailing labels of items, when the information about the intended recipient is not found in the system 100. In other embodiments, camera 116 may be used to photograph other items such as identification cards, users, barcodes, etc. In at least one embodiment, camera 116 is communicatively linked to storage terminal 115, and may be located close to or as a part of the storage terminal 115. In at least one embodiment, if an intended recipient is not found in the server (i.e. either unregistered or unlisted in the search results), the photograph of the mailing label of the item is uploaded to the server 120 for contacting a manger to obtain the contact information of the intended recipient. In at least one embodiment, besides photographing the mailing label using camera 116, the delivery service may also enter information about the intended recipient (e.g., name, address on the mailing label, phone number, etc.), or scan a bar code associated with the item for the server to retrieve information about the intended recipient from the delivery service. In at least one embodiment, the photographs of the mailing label (and/or other information about the intended recipient) is viewed by a manager and/or identified by a manager terminal, to locate the intended recipient and/or obtain information about the intended recipient. In an embodiment, the photographs of the mailing labels may be stored temporarily until the intended recipient is contacted to pick up the item, until the item is picked up, and/or the server registers the intended recipient for future services. In another embodiment, the photographs of the labels may be stored in server or manager terminal so that when another item with the same mailing label is received, the system recognizes the mailing label and retrieves the contact information automatically. In at least one embodiment, the photographs of the mailing labels are stored in storage terminal 115, server, and/or another system capable of storing electronic images. In at least one embodiment, the photographs of the labels may be stored in a location such that the photographs of the labels may be accessed by a delivery person or other user, via a website. In this specification, the terms "photograph" and "image" may be substituted one for the other to obtain different embodiments.

Line 117 communicatively links the camera 116 to the storage terminal 115 for controlling the camera 116 and/or uploading photos or images.

Line 118 communicatively links the storage terminal 115 to the network for transmitting signals between storage terminal 115, the server, the delivery service, and/or the intended recipient.

Line 119 communicatively links the storage bank 110 to a server for managing system 100. Line 119 is optional. In at least one embodiment, line 119 may include electronic wires that physically connect storage bank 110 with server. In yet another embodiment, line 119 includes wireless connections between storage bank 110 and server.

Server 120 is a server that may store, manage, and/or track information about intended recipients, items, storage banks, delivery services, managers, etc. In at least one embodiment, server 120 also registers intended recipients, managers, and delivery services, manages and controls storage areas 111a-n and locks 113a-n, communicates with, and/or authenticates, delivery services, managers, and intended recipients. In at least one embodiment, server 120 includes a database(s) for storing intended recipient data, delivery data, manager data, storage bank data, etc. In at least one embodiment, server 120 includes instructions for handling deliveries, pickups, and/or inquiries, communicating with delivery service, intended recipients, and/or managers. In at least one embodiment, server 120 communicates with a service system of the delivery service to retrieve item information, tracking information, information about the intended recipient, etc.

In at least one embodiment, server 120 assigns an access code to the delivery service for accessing system 100 in order to deliver items to storage bank 110. In at least one embodiment, server 120 generates passwords for intended recipients to access one or more of the storage areas 111a-n. In at least one embodiment, the passwords are valid for only one use (i.e., the password expires after the intended recipient uses the password to pick up an item), or are valid for a limited time (e.g., 8 hours, two days, a week, etc.). In at least one embodiment, server 120 authenticates the validity of the passwords. In at least one embodiment, server 120 hosts a website and/or a user interface for users to register and set up an account, and logon to the website to update user information, leaving messages, tracking mailing status, check items that are ready to be picked up. In other embodiments, server 120 may include other structures or devices for communicating with intended recipients, delivery service 120, and/or managers. In other embodiments, server 120 may include other structures or devices that perform other functions.

Line 121 communicatively links the server 120 to the network for transmitting signals.

Delivery service 130 delivers items for intended recipients to storage bank 110, via handheld devices used by the delivery service 130 or storage terminal 115 that allows delivery service 130 to access system 100 and deposit the item(s) in one or more of storage areas 111a-n. In at least one embodiment, the delivery service 130, upon request, picks up items from vendors, pick-up locations, or warehouses, and delivers the items to intended recipients listed on the mailing labels of the items. In at least one embodiment, delivery service 130 provides tracking information on a website associated with delivery service 130, and may store a history of the item deliveries and information about the intended recipient. In at least one embodiment, server 120 may retrieve tracking information from delivery service 130 and provide the tracking information to the intended recipients. In at least one embodiment, delivery service 130 may notify the intended recipient before and/or after the item has been delivered (e.g., via email, voice message, text message, delivery notes, etc.). In at least one embodiment, delivery service 130 sends delivery information and/or pick up instructions to the intended recipients.

In at least one embodiment, delivery service 130 may include a system of handheld devices for the delivery personnel to carry, which may include an application that interacts with storage bank 110 for accessing the system 100. In at least one embodiment, delivery service 130 may enter access code, search for intended recipients, take and upload photos of the mailing labels, enter tracking number, choose from available storage areas 111a-n, etc. Optionally, the application includes a setting for requiring a signature from the intended recipient prior to unlocking the lock. In another embodiment, delivery service 130 uses a user interface of the storage terminal 115 for accessing the system 100. In at least one embodiment, system 100 may provide a secure and convenient way for delivery service 130 to deliver items to secured storage areas for intended recipients to pick up.

In at least one embodiment, delivery service 130 uses an access code that may be assigned by server 120 to access system 100 or login to an account associated with the delivery service 130. In at least one embodiment, delivery service 130 may view, in the account of delivery service 130, a list of unretrieved and/or returned items, and open the storage areas to collect the returned and/or unretrieved items. The unretrieved or returned items may then be returned to the senders. In at least one embodiment, delivery service 130 may search for an intended recipient by entering the name of the intended recipient. If the intended recipient is found in the system 100, in an embodiment, the delivery service 130 may view the search result and select the intended recipient, and may choose an option whether a signature of the intended recipient is required prior to unlocking the lock. In at least one embodiment, the delivery service 130 may be presented an option for requiring a signature whether or not the intended recipient is found in the list of intended recipients of system 100. In at least one embodiment, the delivery service 130 may also choose the size of storage area (e.g., small, medium, large, oversized, etc.) based on the size of the item, and may view the numbers of available storage areas 111a-n in each size. In at least one embodiment, delivery service 130 receives a storage area number of one of the storage areas 111a-n that is assigned and opened by system 100 to deposit the item. In at least one embodiment, if the intended recipient is not found in the system 100, the delivery service 130 may be asked to photograph the mailing label and/or input the information about the intended recipient (e.g., the intended recipient name) for contacting a manager. Optionally, the delivery service 130 may enter tracking number or scan tracking bar code and upload the tracking number and the bar code to the server 120. Then the delivery service 130 may deposit the item in a storage area assigned and opened by the storage terminal 115. In at least one embodiment, the delivery service 130 closes and/or locks the door of the storage area after dropping off the item. Optionally, delivery service 130 may receive a confirmation from system 100 that the item is ready to be picked up and/or request delivery service 130 to confirm that the item is in the storage area waiting to be picked up. Optionally, delivery service 130 may request the system 100 to assign another storage area if the item does not fit in the originally assigned storage area.

In at least one embodiment, delivery service 130 may receive a request from the vendor, the person that sends the item, or the intended recipient to deliver the item to a specific storage bank and/or a specific storage area. In at least one embodiment, the storage terminal assigns one of the storage areas 111a-n that is not currently in use for the delivery service 130 to drop off the item. In at least one embodiment, if the item is not picked up by the intended recipient in a predetermined period (e.g., three weeks, one month, six months, etc.), the delivery services 130 may pick up the item from the same storage area and return the item.

Line 131 communicatively links the delivery service 130 to the network for the delivery service 131 to communicate with storage bank 110, server 120, intended recipient, etc. In at least one embodiment, the handheld devices of the delivery personnel communicates via line 131 and network 140 with storage bank 110 and server 120 to access system 100 for delivering items.

Line 132 communicatively links the delivery service 130 to the storage bank 110. Line 132 is optional.

Network 140 may be any one or any combination of one or more Local Area Networks (LANs), Wide Area Networks (WANs), wireless networks, telephone networks, and/or other networks. Network 140 may be used by storage bank 110, server 120, delivery services 130, intended recipients, and/or managers to communicate with one another regarding items being delivered to storage areas 1112a-n and/or intended recipients to be contacted for picking up the items.

Intended recipient 150 is a person or entity that receives items or other deliveries in storage bank 110. In at least one embodiment, intended recipient 150 resides or works in a building where storage bank 110 is located, or within a pickup radius. System 100 may include any number of intended recipients. In at least one embodiment, intended recipient 150 is registered and/or has an established account in server 120, and information of intended recipient 150 may be stored in the memory of server 120. Intended recipient 150 may have registered with the system 100, via a user interface at storage terminal 115, by intended recipient terminal 151, mobile terminal 155, and/or may register by phone 153. In at least one embodiment, intended recipient 150 may select a preferred storage bank 110 to which items for the intended recipient 150 may be delivered. For example, perhaps a first storage bank is in the apartment building where intended recipient 150 resides, and perhaps a second storage bank is in the office building where the intended recipient 150 works. In this example, intended recipient 150 may select, optionally via the registered account in server 120, which storage bank to delivery some or all of the items for the intended recipient 150. In at least one embodiment, information about intended recipient 150 is stored by a manager of the building in which the intended recipient 150 resides or works, and the manager may provide the information about intended recipient 150 if the delivery person cannot find a listing for intended recipient 150 (perhaps the delivery person has the wrong spelling of the name). The information provided by the manager may be used to register the intended recipient 150, optionally upon approval of the intended recipient 150. In at least one embodiment, intended recipient 150 is not registered in server 120 but may still receive an item delivered to the storage bank 110. In this embodiment, server 120 may contact the manager to obtain information about the intended recipient, and/or may automatically register the intended recipient 150 in the server 120. Alternatively, intended recipient 150 may be directly contacted by the manager to pick up items.

In at least one embodiment, intended recipient 150 may own and/or use various electronic devices including an intended recipient terminal, a phone, and/or a mobile device for communicating and receiving e-mails, instant messaging, Short Message Service (SMS) messaging, and/or other forms of text and/or voice communications. In at least one embodiment, intended recipient 150 receives a notification, optionally from delivery service 130, server 120, and/or manager 160 that an item is waiting to be picked up in one of the storage areas 111a-n of storage bank 110. In at least one embodiment, intended recipient 150 receives delivery information and a password from server 120 or manager for accessing the storage area to pick up the item. In at least one embodiment, intended recipient 150 enters the password and/or other information into the storage terminal 115 of storage bank 110, and confirms to pick up the item. The storage terminal 115 then opens the lock of the storage area within which the item is deposited, and the intended recipient 150 may pick up the item and close the door of the storage terminal. In at least one embodiment, the intended recipient 150 provides a signature or other identification or confirmation to the storage terminal 115 before the storage terminal unlocks the storage area. Optionally, after the intended recipient 150 enters the password, a signature is required (i.e. if the delivery service 130 chooses the option to require a signature) before the system 100 opens the lock of the storage area. In at least one embodiment, intended recipient 150 may use the mobile device or the storage terminal 115, which may include a pad for the intended recipient 150 to sign, to enter and upload the signature to the server 120, and then the system 100 opens the lock and shows the storage area number where the item is stored.

Intended recipient terminal 151 is a terminal or network appliance that may be used by intended recipient 150 to receive notifications from or to communicate with server 120, delivery service 130, or manager regarding items to be picked up. In this specification, the term "network appliance" refers to any appliance capable of communicating via a network. Intended recipient terminal 151 may also be used for other purposes such as browsing websites, computing, utilizing software, playing games, etc. For example, intended recipient terminal 151 may be a personal computer, a handheld computer, a terminal linked to a computer, or any other network appliance. In at least one embodiment, intended recipient terminal 151 is communicatively linked to network 140.

Line 152 communicatively links the intended recipient terminal 151 to the network 140 for the intended recipient terminal 151 to communicate with the storage bank 110, server 120, delivery service 130, manager 160, etc. In at least one embodiment, the intended recipient terminal 151 receives via line 152 notifications from server 120, storage bank 110, and/or delivery service 130 that an item(s) is waiting to be picked up.

Phone 153 is an ordinary phone that may be used by intended recipient 150 to communicate with (e.g., via phone calls, voice messages, etc.) server 120, delivery service 130, or manager regarding items or other issues. In at least one embodiment, phone 153 is communicatively connected to network 140.

Line 154 communicatively links the phone 153 to the network 140 for the phone 153 to communicate with the storage bank 110, server 120, delivery service 130, manager 160, etc. In at least one embodiment, phone 153 receives via line 154 from storage bank 110, server 120, delivery service 130, and/or manager 160 notifications about items to be picked up.

Mobile terminal 155 is a mobile device used and/or owned by consumer 150 for communicating (e.g., via phone calls, voice messages, text messages, emails, etc.) with server 120, delivery service 130, or manager regarding items to be picked up or other issues. Mobile terminal 155 may store an application that was downloaded from server 120. The application may interface with server 120, and presents to the intended recipient 150 a page via which the intended recipient 150 may request to open a storage area, which may cause server 120 and/or storage terminal 115 to open a storage area so that the intended recipient 150 may retrieve an item left in the storage area for the intended recipient 150. The application may include a page via which the intended recipient 150 may enter a signature, via a touch screen or upload a stored signature, which the server 120 and/or storage terminal 115 may authenticate. Whether or not the intended recipient 150 is granted entry into the storage area containing the items left for the intended recipient 150 may depend on whether the signature was uploaded and/or whether the signature was determined to be authentic. Mobile terminal 155 may also have other uses, such as making phone calls, browsing a network, personal computing, and/or receiving messages. For example, mobile terminal 155 may include smart phones, PDA (Personal Digital Assistant), tablet PCs, laptops, and/or other electronic mobile devices. In at least one embodiment, the intended recipient 150 may be contacted via at least one of intended recipient terminal 151, phone 153, and mobile terminal 155. Intended recipient terminal 151, phone 153, and mobile terminal 155 are just some examples of the many different ways that system 100 may communicate with intended recipient 150. In at least one embodiment, mobile terminal 155 is communicatively connected to network 140.

Line 156 communicatively links the mobile terminal 155 to the network 140 for transmitting signals. In at least one embodiment, mobile terminal 155 may receive via line 156 notifications such as phone calls, voice messages, texts, and emails from storage bank 110, server 120, delivery service 130, and/or manager 160 about items to be picked up. In another embodiment, mobile terminal 155 may access system 100 via line 156 to enter a password and/or upload a signature to request the system 100 to open the lock to the storage area that stores the item.

Manager 160 may include representatives or employees, computer systems, and/or devices for managing and overseeing issues or management information related to users, residents, or entities in a building or company (e.g., an apartment building, an office building, a school, etc.). In at least one embodiment, manager 160 communicates with users or residents in the building and stores contact information and other information of the users or residents. In at least one embodiment, manager 160 may be located in the same building as the users. In other embodiments, manager 160 may be located at other locations. In at least one embodiment, manager 160 manages users in more than one building or entities which share one storage bank 110. In another embodiment, one storage bank 110 may be shared by users in different buildings or entities that are managed by different managers.

In at least one embodiment, manager 160 is contacted by server 120 regarding intended recipients that are not registered in server 120. In at least one embodiment, manager 160 may be registered with a house account in server 120, which house account may receive photographs of mailing labels and/or information about the intended recipient 150, which are used for locating and/or identifying the intended recipients by the manager 160. In at least one embodiment, manager 160 provides information about the intended recipient 150 to server 120, or may contact the intended recipients directly. In at least one embodiment, manager 160 is in communication with storage bank 110, server 120, delivery service 130, and/or intended recipient 150.

Manager terminal 161 is a computer system used by manager 160 for controlling management of the building or entities, storing, updating, and/or managing user information, communicating with server 120 and/or intended recipient 150 regarding delivery information, user identification, etc. For example, manager terminal 161 may include one or more web servers and/or one or more administrative servers. Users may log on to a website of the manager terminal 161, update user information, leaving messages, check items that are ready to be picked up, set up an account, and/or make payments. Alternatively, manager terminal 161 may communicate with users via e-mail, instant messaging, Short Message Service (SMS) messaging, and/or other forms of text and/or voice communications. In at least one embodiment, manager terminal 161 is communicatively connected to network 140.

In at least one embodiment, manager terminal 161 includes a memory system for storing information of users in the building or entity managed by manager 160. In at least one embodiment, manager terminal 161 includes a house account that is associated with at least one storage bank 110, so that when server 120 may contact the house account of manager terminal 161 for identify and/or contact intended recipients. In at least one embodiment, the house account of manager terminal 161 receives from server 120 a photograph of mailing label that is taken at the storage terminal 115, via camera 116, or taken via a camera on the handheld device of the delivery system 130. In at least one embodiment, manager terminal 161 includes instructions and algorithms to identify the intended recipient name and/or mailing address from the photograph of mailing label, and then compare with information stored in the memory of manager terminal 161 to identify the intended recipient and retrieve information about the intended recipient stored in the memory of the manager terminal 161. In another embodiment, manager terminal 161 receives an intended recipient name and/or mailing address that is entered by delivery service 130 via storage terminal 115 for identifying the intended recipient. In this embodiment, manager terminal 161 uses the intended recipient name and/or mailing address entered by the delivery service 130 to search and/or identify the intended recipient in the memory of manager terminal 161. In an embodiment, manager terminal 161 sends the retrieved information about the intended recipient to server 120 so that the server 120 may contact the intended recipient to pick up the item and/or so that the server 120 may register the intended recipient. In another embodiment, manager terminal 161 may directly contact and notify the intended recipient that an item is waiting to be picked up.

Phone 162 is similar to phone 153 except that phone 162 is used by manager 160 or a representative in manager office for contacting intended recipient 150. In at least one embodiment, phone 162 is used to call intended recipient 150 and/or leave a message for intended recipient 150 to pick up the item in storage bank 110, after the manager 160 identifies and locates the intended recipient 150 according to mailing labels and/or other information received from server 120. In at least one embodiment, phone 162 may be used to receive phone calls from intended recipient 150, storage bank 110, and/or delivery service 130, regarding information about the intended recipient 150 and/or delivery information. In at least one embodiment, phone 162 is communicatively linked to network 140. In at least one embodiment, phone 162 is a telephone extension of an internal phone line, which is communicatively connected to other telephone extensions that may be used by different intended recipients, via an internal line.

Line 163 communicatively links the manager 160 to the network 140 for transmitting signals. In at least one embodiment, manager terminal 161 or phone 162 of manager 160 may receive intended recipient name and other information from server 120 via line 163. In at least one embodiment, the manager terminal 161 may send via line 163 information about the intended recipient 150 to server 120 for locating the intended recipient 150 and/or registering the intended recipient 150.

Line 164 communicatively links the manager 160 to the intended recipient 150 so that the manager 160 may communicate with the intended recipient 150 and/or notify the intended recipient 150 that an item is waiting to be picked up. In at least one embodiment, line 164 includes an internal telephone line which allows the manager 160 and intended recipient 150 to communicate via telephone extensions. In at least one embodiment, line 164 includes a local area network (LAN) and/or a wide area network (WAN) that interconnects computers or electronic devices within a limited area (e.g., in the same apartment building, office building, school, etc.). In at least one embodiment, line 164 includes wired or wireless connections, or other types of connections.

Figure 2:
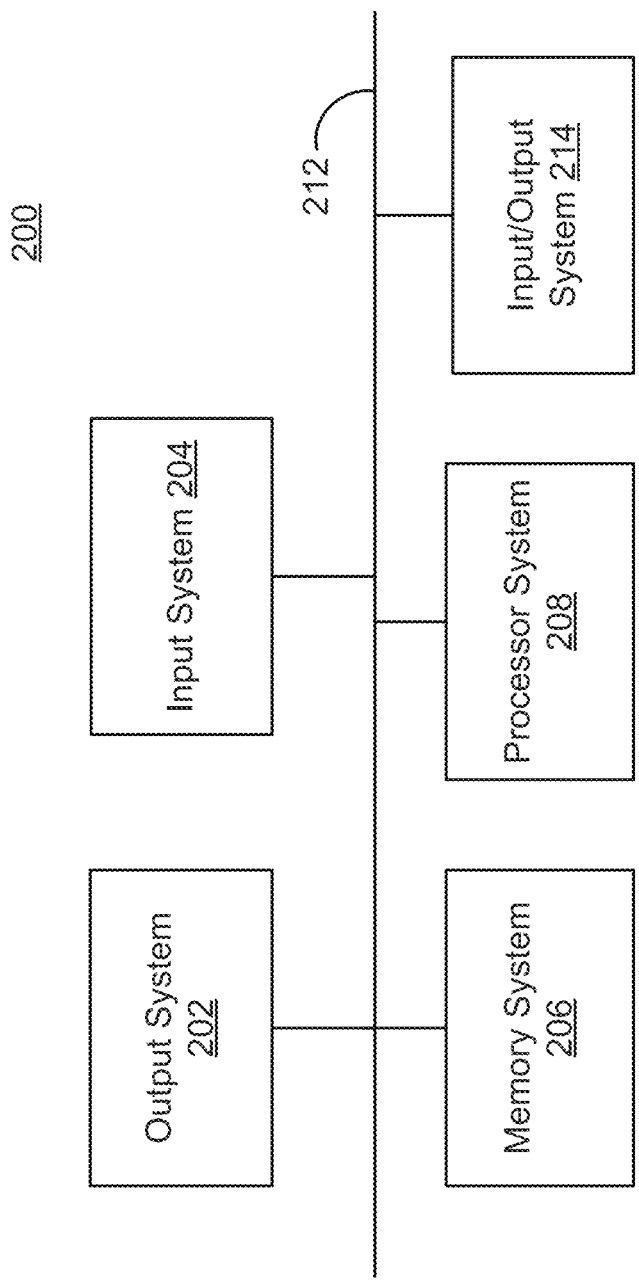
FIG. 2 shows a block diagram of an embodiment of a computer system used in the system shown in FIG. 1.

FIG. 2 shows a block diagram of an embodiment of computer system 200 used in the system shown in FIG. 1. The computer system 200 may include output system 202, input system 204, memory system 206, processor system 208, communications system 212, and input/output system 214. In other embodiments, computer system 200 may not include all of the components listed and/or may include other components in addition to or instead of those listed above.

Computer system 200 may be an embodiment of server 120, intended recipient terminal 151, mobile terminal 155, and/or manager terminal 161. Output system 202 may include any one of, some of, any combination of, or all of a monitor system, a handheld display system, a printer system, a speaker system, a connection and/or interface system to one or more sound systems, a connection and/or interface system to one or more peripheral devices, a connection and/or interface system to one or more computer systems, a connection and/or interface system to one or more LANs, and/or a connection and/or interface system to one or more WANs, for example.

Input system 204 may include any one of, some of, any combination of, or all of a keyboard system, a mouse system, a track ball system, a track pad system, buttons on a handheld system, a scanner system, a microphone system, a connection and/or interface to a sound system, and/or a connection and/or interface system to a computer system, a connection and/or interface to an intranet, and/or a connection and/or interface to an internet (e.g., IrDA, USB), for example.

Memory system 206 may include, for example, any one of, some of, any combination of, or all of a long term storage system, such as a hard drive; a short term storage system, such as random access memory and/or flash memory; and/or a removable storage system, such as a floppy drive or a removable drive. Memory system 206 may include one or more machine-readable mediums that may store a variety of different types of information. The term "machine-readable medium" is used to refer to any nontransitory medium capable of carrying information that is readable by a machine. One example of a machine-readable medium is a computer-readable medium. Another example of a machine-readable medium is paper having holes that are detected that trigger different mechanical, electrical, and/or logic responses.

In an embodiment of computer system 200 that is used as the server 120, memory system 206 stores software for communicating with storage terminal 115, delivery service 130, intended recipient 150 and/or manager 160. In an embodiment of computer system 200 that is used as the server 120, memory system 206 stores software that may include machine instructions for storing and managing information about deliveries and intended recipients, registering intended recipient 150, contacting intended recipients, managing storage banks, managing storage areas, generating passwords, authenticating users, etc. In an embodiment of computer system 200 that is used as the server 120, memory system 206 may further store a downloadable application for accessing the system 100, which may be downloaded by electronic devices of delivery service 130, intended recipient 150 and/or manager 160. In an embodiment of computer system 200 that is used as the intended recipient terminal 151 or mobile terminal 155, memory system 206 stores software for communicating with storage terminal 115, server 120, delivery service 130, and/or manager 160. In an embodiment of computer system 200 that is used as the intended recipient terminal 151 or mobile terminal 155, memory system 206 stores software that may include machine instructions for receiving and displaying notifications of items, registering and accessing system 100, etc. In an embodiment of computer system 200 that is used as the mobile terminal 155, memory system 206 stores software that may further include machine instructions for entering passwords, capturing signatures, and uploading signatures, etc. In an embodiment of computer system 200 that is used as the manager terminal 161, memory system 206 includes software for communicating with storage terminal 115, server 120, delivery service 130, and/or intended recipient 150. In an embodiment of computer system 200 that is used as the manager terminal 161, memory system 206 includes software that may include machine instructions for storing and managing user information, receiving requests from server 120 for locating users, searching user information, sending user information to server 120, contacting users, etc. Memory system 206 will be discussed further in connection with FIGS. 4 and 5.

Processor system 208 may include any one of, some of, any combination of, or all of multiple parallel processors, a single processor, a system of processors having one or more central processors and/or one or more specialized processors dedicated to specific tasks. In an embodiment of computer system 200 that is used as the server 120, processor system 208 may implement machine instructions stored in memory system 206, such as software for communicating with storage terminal 115, delivery service 130, intended recipient 150 and/or manager 160. In an embodiment of computer system 200 that is used as the server 120, processor system 208 may implement machine instructions stored in memory system 206, such as software for storing and managing information about deliveries and intended recipients, software for registering and contacting intended recipients, software for managing storage banks and storage areas, and/or software for generating passwords, authenticating users, etc. In an embodiment of computer system 200 that is used as the intended recipient terminal 151 or mobile terminal 155, processor system 208 may implement machine instructions stored in memory system 206, such as software for communicating with storage terminal 115, server 120, delivery service 130, and/or manager 160. In an embodiment of computer system 200 that is used as the intended recipient terminal 151 or mobile terminal 155, processor system 208 may implement machine instructions stored in memory system 206, such as software for receiving, notifications of items, displaying notifications of items, registering intended recipients, and/or accessing system 100, etc. In an embodiment of computer system 200 that is used as the mobile terminal 155, processor system 208 may further implement machine instructions stored in memory system 206, such as software for entering passwords, capturing signatures, and/or uploading signatures, etc. In an embodiment of computer system 200 that is used as the manager terminal 161, processor system 208 may implement machine instructions stored in memory system 206, such as software for communicating with storage terminal 115, server 120, delivery service 130, and/or intended recipient 150. In an embodiment of computer system 200 that is used as the manager terminal 161, processor system 208 may implement machine instructions stored in memory system 206, such as software for storing user information, managing user information, receiving requests from server 120 for locating users, searching for intended recipients, and sending user information to server 120, and/or contacting users, etc.

Communications system 212 communicatively links output system 202, input system 204, memory system 206, processor system 208, and/or input/output system 214 to each other. Communications system 212 may include any one of, some of, any combination of, or all of electrical cables, fiber optic cables, and/or means of sending signals through air or water (e.g., wireless communications), or the like. Some examples of means of sending signals through air and/or water include systems for transmitting electromagnetic waves such as infrared and/or radio waves and/or systems for sending sound waves.

Input/output system 214 may include devices that have a dual function as input and output devices. For example, input/output system 214 may include one or more touch sensitive screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example. Input/output system 214 is optional, and may be used in addition to or in place of output system 202 and/or input device 204.

Figure 3:
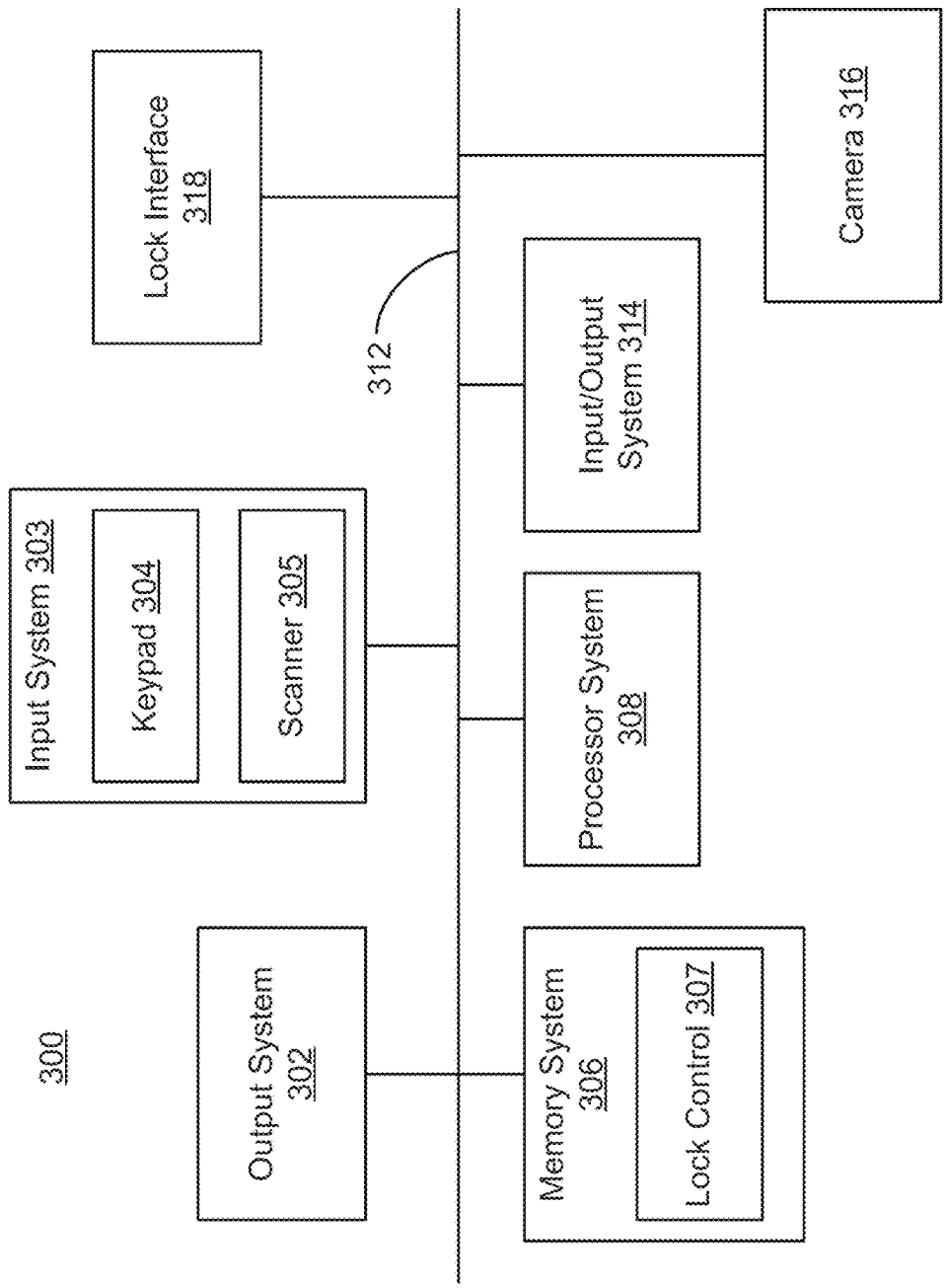
FIG. 3 shows a block diagram of an embodiment of a storage terminal that may be used as the storage terminal of FIG. 1.
Figure 4:
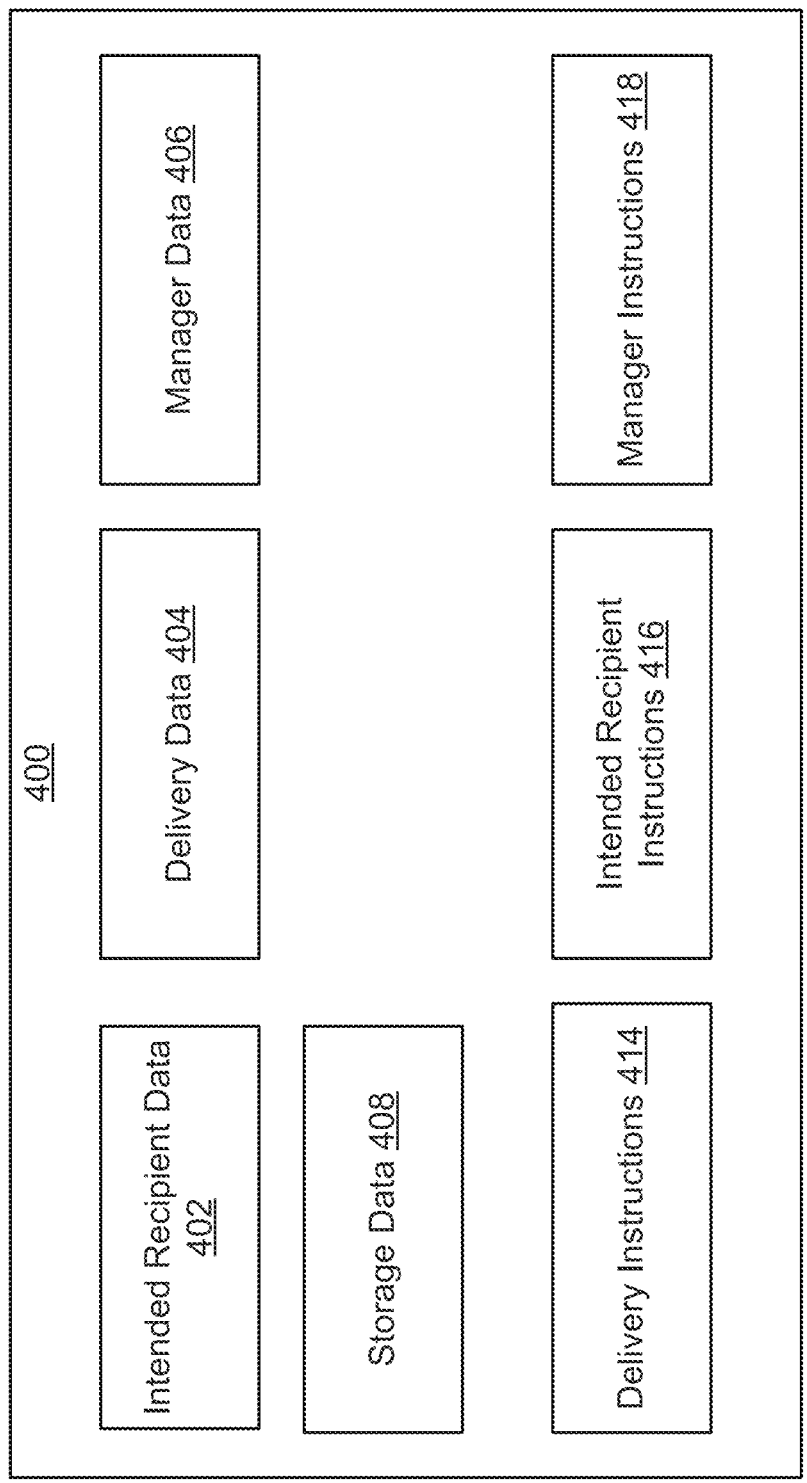
FIG. 4 shows a block diagram of an embodiment of a memory system that may be used in the server of FIG. 1.

FIG. 3 shows a block diagram of an embodiment of a storage terminal 300 that may be used as the storage terminal 115 of FIG. 1. The storage terminal 300 may include an output system 302, an input system 303 that includes at least a keypad 304 and a scanner 305, a memory system 306 that includes at least a lock control 307, a processor system 308, a communications system 312, an input/output system 314, an optional camera 316, and a lock interface 318. In other embodiments, storage terminal 300 may not include all of the components listed and/or may include other components in addition to or instead of those listed above.

Storage terminal 300 is one example of the storage terminal 115 in FIG. 1. In storage terminal 300, output system 302, communications system 312, and input/output system 314 may be the same as output system 202, communication system 212, and input/output system 214, respectively, which were described in conjunction with FIG. 2, above.

Input system 303 is similar to the input system 202, which was discussed in conjunction with FIG. 2. However, input system 303 may further include a keypad 304 and/or a scanner 305.

Keypad 304 is a keypad that facilitates entering a password or password for accessing at least one of the storage areas 111a-n. In at least one embodiment keypad 304 may be part of the storage terminal 300 or a separate keypad that is connected to the storage terminal via a cable or wire, or via wireless connection. In another embodiment, each of the doors 112a-n or receptacle of storage areas 111a-n may include a keypad 304 mounted to the door or receptacle and connected to the storage terminal 115, and a user may walk up to the storage area to key in the password or password. Alternatively, a user may use a touch sensitive screen to enter information into the storage terminal 115.

Scanner 305 is a scanner device that is used to scan barcodes or other patterns that are printed on the mailing label or are shown on a device of the delivery service.

Scanner 305 is optional. In at least one embodiment, scanner 305 scans the barcodes or patterns and upload them to the storage terminal 115 and/or server 120, which recognize the barcodes or patterns and may retrieve information optionally from server 120, a service system of delivery service 120, or other databases. In other embodiments, scanner 305 includes other structures and/or functions.

Memory system 306 stores software for communicating with the server 120, delivery service 130, intended recipient 150, and/or manager 160 in at least one embodiment. In at least one embodiment, memory system 306 stores software that may include machine instructions for managing and controlling access to storage areas 111a-n of storage bank 110, assisting deliveries and pickups, photographing and uploading labels, assigning and displaying storage area information, capturing and uploading signatures, etc. In at least one embodiment, memory system 306 may further include a lock control 307 for controlling and managing locks 113a-n of the storage areas 111a-n.

Processor system 308 may implement machine instructions stored in memory system 306, such as software for communicating with the server 120, delivery service 130, intended recipient 150, and/or manager 160. Processor system 308 may implement machine instructions stored in memory system 306, such as software for managing and controlling access to storage areas 111a-n of storage bank 110, assisting deliveries and pickups, photographing and uploading labels, assigning storage areas 111a-n, displaying storage area information, capturing signatures, and/or uploading signatures, etc.

Lock control 307 includes instructions and/or algorithms for controlling and managing the locks 113a-n. In at least one embodiment, lock control 307 receives a request to deposit an item, and select one of the storage areas 111a-n that is not currently in use and send a signal to the lock of the storage area to open the lock. In at least one embodiment, lock control 307 receives a confirmation that the lock of the selected storage area is locked after the item is dropped off, records the storage information (e.g., storage identifier, time of delivery, location, etc.) and generates a password to send to server 120. In at least one embodiment, lock control 307 receives a password entered by an intended recipient 150 and a request to open a lock. In at least one embodiment, lock control 307 authenticates the intended recipient 150 by comparing the entered password with the predetermined password. If the entered password matches the predetermined password, the lock control 307 sends a signal to the same lock of the storage area where the item is stored to open the lock. If the entered password and the predetermined password do not match, access is denied and the lock control 307 sends a message to notify the intended recipient 150 that the password is invalid. In at least one embodiment, lock control 307 receives a confirmation that the lock of the storage area is locked after the intended recipient 150 picks up the item, and the storage area is ready for another use. Lock control 307 may include an option to require a signature prior to opening a lock. The option may be presented to the delivery service 130 when the delivery service 130 is delivering a item, and if the delivery service 130 selects the option, and then as a result lock control 307 will not open the lock until the intended recipient 150 enters a signature. Optionally, each lock has a panel or keypad for entering passwords, and the lock control 307 assigns and/or records a password to the storage area that stores the item. In at least one embodiment, when the intended recipient 150 enters a password via the panel or keypad of the lock, the lock sends signals to the storage terminal 300 and the lock control 307 authenticates the intended recipient 150 (e.g., by authenticating a password and/or signature) and returns a signal to the lock to open or to deny access. Alternatively, server 120 may generate passwords and/or performs the authentication functions.

Camera 316 is similar to camera 116, which was discussed in conjunction with FIG. 1. In at least one embodiment, camera 316 is controlled by the processor system 308. In at least one embodiment, camera 316 captures the photographs of mailing labels when a intended recipient 150 cannot be located in the system 100, and the photographs of the mailing labels may be save in memory system 306 and/or may be uploaded to server 120. In at least one embodiment, the photographs may be displayed, via output system 302 or input/output system 314.

Lock interface 318 is a device and/or a system for communicatively connecting the storage terminal 300 and each of the locks 113a-n. In at least one embodiment, lock interface 318 includes a controller with circuits for directing and controlling signals transmitted between storage terminal 300 and each of the locks 113a-n. In at least one embodiment, lock interface 318 is connected to each of the locks 113a-n by cables or wires, or via wireless connections. Signals sent from lock interface to locks 112a-n may lock and unlock locks 113a-n, based on the entry of a password and/or the entry of information about the intended recipient 150 identifying an intended recipient 150 that an item is intended for.

FIG. 4A shows a block diagram of an embodiment of memory system 400 that may be used in computer 200 of FIG. 2 when used as the server 120 of FIG. 1. Memory system 400 may include intended recipient data 402, delivery data 404, manager data 406, storage data 408, delivery instructions 414, intended recipient instructions 416, and manager instructions 418. In other embodiments, memory system 400 may not include all of the components listed and/or may include other components in addition to or instead of those listed above.

Memory system 400 may be an embodiment of memory system 206 in which computer system 200 is an embodiment of server 120 of FIG. 1.

Intended recipient data 402 includes information that relates to intended recipient 150. In at least one embodiment, intended recipient data 402 may include any of a variety of different types of information about intended recipients, such as names, mailing addresses, e-mail addresses, phone numbers, instant messaging addresses, billing information, other contact information, account information, and/or default service preferences. In this specification, the terms "data" and "information" may be substituted one for the other to obtain different embodiments.

Delivery data 404 may include, but is not limited to, information about delivery service 130, scheduled time for deliveries and/or pickups, tracking information, and item information (e.g., the source of the item, size and/or weight, pickup instructions for items, storage area identifiers associated with items currently waiting to be picked up, delivery time, pickup time, etc.). In at least one embodiment, delivery data 404 includes an expected date and/or time of when the item is expected to be ready for pickup and is expected to be waiting in one of storage areas 111a-n. In at least one embodiment, delivery data 404 includes information regarding the status of the items, such as shipped, in transit, out for delivery, delivered, whether and/or when being picked up, etc. If there are multiple locations where storage areas 111a-n are located or items for the same intended recipient 150 are dropped off at different storage areas 111a-n, delivery data 404 may include information about which location to pick up which item(s).

Manager data 406 includes information that relates to at least one manager 160. In at least one embodiment, manager data 406 includes location, hours, and/or contact information about at least one manager 160 and about the house account associated with the manager 160. In at least one embodiment, manager data 406 includes information about more than one manager 160, and may include information about which manager is managing which building or entity that is associated with which storage bank 110. In at least one embodiment, if multiple house accounts or managers are associated with one storage bank, manager data 406 includes information about the managing scope or entities of each manager 160, so that server 120 may decide which house account or manager 160 to contact if a item is delivered to an unregistered or unlisted intended recipient 150.

Storage data 408 may include machine information about locations and/or operating hours of all storage banks, numbers of storage areas 111a-n of each storage bank 110, sizes and/or shapes of storage areas 111a-n, which one of locks 113a-n is controlling which one of storage areas 111a-n, which storage areas 111a-n are currently in use, time of storage, etc. In at least one embodiment, storage data 408 may be checked online and/or via a user interface.

Delivery instructions 414 may include instructions for communicating with delivery service 130, handling items or other deliveries, and/or managing delivery data 404. In at least one embodiment, delivery instructions 414 allows delivery service 130 to register to system 100 in order to access storage bank 110 using an access code, optionally designated by the server 120. In at least one embodiment, delivery instructions 414 controls the transfer of information between server 120 and delivery service 130. For example, delivery instructions 414 may retrieve item and/or mailing information from delivery service 130 and update delivery data 404 in server 120. In another example, delivery instructions 414, when implemented by a processor, may request and/or transmit confirmation information, confirming that one or more items were deposited and/or picked up. Delivery instructions 414, when implemented by a processor may update information in delivery service 130 and/or delivery data 404 in server 120. In at least one embodiment, delivery instructions 414 assigns one or more of storage areas 111a-n for deposit items, and records whether and/or when a item is dropped off and/or picked up. In at least one embodiment, delivery instructions 414 keep track of the period of time an item is stored in storage bank 110, and identifies items that are still unclaimed after a period of time (e.g., one week, one month, six months, etc.). In this embodiment, delivery instructions 414 may notify delivery service 130 that an item(s) was not picked up during that period of time. Additionally or alternatively, delivery instructions 414 may identify when an item may need to be returned to sender, because, for example, the recipient has not picked up the item after given amount of time after the item has been delivered.

Intended recipient instructions 416 may include machine instructions for receiving information from intended recipient 150, registering and managing intended recipient data 402, searching for intended recipient 150, authentication, and/or transferring information to intended recipient 150. The transfer of information that intended recipient instructions 416 controls may include a direct interaction with intended recipient 150 or an interaction that occurs via manager 160. For example, intended recipient 150 may directly interact with intended recipient instructions 416 by logging on to a website associated with system 100 or server 120, if memory 400 is memory 206. Alternatively, intended recipient 150 may directly interact with intended recipient instructions 416 via phone 153 and either talk to a representative or interact with automated telephone services. In this embodiment, intended recipient instructions 416 may be automated telephone services or an automated answering machine that includes a voice menu (and the voice responses of the user may be converted into machine instructions that are automatically sent to intended recipient data 402 and/or delivery service data 404). In yet another embodiment, intended recipient 150 may call or contact delivery service 130 or manager 160. The delivery service 130 or manager 160 may then input information about the intended recipient into or retrieve information from server 120 by interacting with intended recipient instructions 416.

In at least one embodiment, intended recipient instructions 416 may receive inquiry from storage terminal 115 to perform a search in the intended recipient data 402, and intended recipient instructions 416 may return the searched information about the intended recipient to storage terminal 115 if intended recipient 150 is registered. In another embodiment, if intended recipient 150 is not registered thus cannot be found in intended recipient data 402, intended recipient instructions 416 may return a message to storage terminal 115 indicating that intended recipient 150 cannot be found in the server 120. In at least one embodiment, intended recipient instructions 416 may request for and receive from manager 160 for information of unregistered intended recipients. In at least one embodiment, an intended recipient may be registered in system 100 using another name or title (e.g., middle name, the title of the company, etc.), which is different from the name on the mailing label of the item. In this embodiment, delivery service 130 may not find the intended recipient using the name on the mailing label but the manager 160 may be able to identify the intended recipient and return the registered intended recipient name and/or other information. Intended recipient instructions 416 may automatically set up new accounts for new intended recipients after receiving new information about the intended recipient from the manager 160. In at least one embodiment, intended recipient instructions 416 include a user interface for intended recipient 150 to register an account, enter information, check item delivery information, and/or communicate with system 100.

In at least one embodiment, intended recipient instructions 416 contact the intended recipient 150 with pickup information after an item(s) is delivered. In at least one embodiment, intended recipient instructions 416 receives intended recipient preferences such as preferred time and method to contact the intended recipient 150, preferred delivery locations, etc. For example, intended recipient instructions 416 send notifications at the preferred time period (e.g., in the morning, or after 7:00 pm, etc.) and/or via the preferred contact method (e.g., via email, or text message, etc.) for the intended recipient 150. In another example, intended recipient instructions 416 may record a preferred storage bank selected by the intended recipient 150, and may send the intended recipient preference to delivery service 130. In another embodiment, intended recipient instructions 416, by default, send a text message, an email, and/or a voice message to the intended recipient 150 when an item(s) is ready to be picked up in storage bank 110 that is closest to the intended recipient 150 (e.g., in the apartment building or office building of the intended recipient 150).

Manager instructions 418 may include machine instructions for communicating with manager 160, registering a house account associated with manager 160, managing the manager data 402, searching or identifying manager 160, and/or transferring information to manager 160. In at least one embodiment, manager instructions 418 allows manager 160 to register a house account in server 120 on a website associated with system 100 or server 120. In at least one embodiment, manager instructions 418 contacts manager 160 and transmits photographs of mailing labels and/or other information to the house account of manager 160, inquiring manager 160 to identify the intended recipient 150 and feedback with information about the intended recipient 150. In at least one embodiment, manager instructions 418 receive information about the intended recipient 150 from manager 160 and/or update intended recipient data 402. In at least one embodiment, manager instructions 418 send item information and access code to manager 160, and send a request to manager 160 to contact the intended recipient 150. In at least one embodiment, if more than one house account of more than one manager shares one storage bank 110, manager instructions 418 determines which house account to contact based on manager data 406 and item data 404. For example, if two office buildings share one storage bank 110, manager instructions 418 identify which building the unregistered or unlisted intended recipient 150 is located based on the mailing label in order to contact the manager of the building.

In an embodiment, delivery data 404 may be updated by delivery instructions 414, intended recipient instructions 416, and/or manager instructions 418. For example, delivery instructions 414 may update the delivery data 404 after the item is deposited by updating the time and storage identifier of the storage area in storage bank 110. In an embodiment, delivery data may be updated by the intended recipient instructions 416 or manager instructions 418 to show whether the intended recipient 150 is notified to pick up the item, at the time that the intended recipient 150 is contacted by intended recipient instructions 416 or manager instructions 418 to pick up the item. Alternatively, all or part of delivery data 404 is created and/or updated by representatives of delivery service 130.

Figure 5:
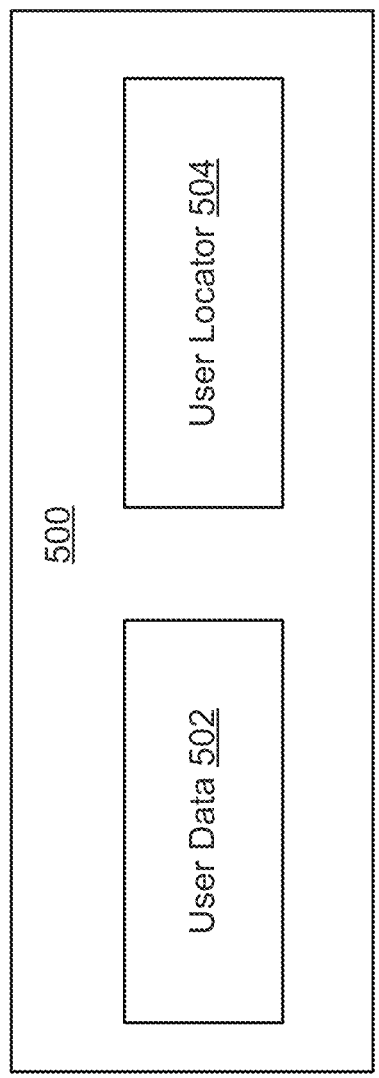
FIG. 5 shows a block diagram of an embodiment of a memory system that may be used in the manager terminal of FIG. 1.

FIG. 5 shows a block diagram of an embodiment of a memory system 500 that may be used in the manager terminal 161 of FIG. 1. Memory system 500 may include at least user data 502 and user locator 504. In other embodiments, memory system 500 may not include all of the components listed and/or may include other components in addition to or instead of those listed above.

Memory system 500 may be an embodiment of memory system 206 in which computer system 200 is an embodiment of manager terminal 161 of FIG. 1.

User data 502 includes information that relates to users, residents, or employees of the building or entity that is managed by manager 160. In at least one embodiment, user data 502 may include any of a variety of different types of information about users, such as names, mailing addresses, e-mail addresses, phone numbers, instant messaging addresses, billing information, other contact information, account information, and/or default service preferences.

User locator 504 includes instructions for extracting, comparing, identifying, recognizing user information from photographs of mailing labels and/or information about the intended recipient 150 received from server 120 and optionally entered by delivery service 130, when intended recipients are not found in intended recipient data 402. In at least one embodiment, user locator 504 includes instructions and/or algorithms to extract information from images such as photographs of mailing labels. In another embodiment, user locator 504 shows the photographs, optionally via a user interface at manager terminal 161, to an employee or representative of the managing office who then identifies or recognizes the intended recipients, and user locator 504 receives information about the intended recipient 150 entered by the employee or representative. In at least one embodiment, user locator 504 compares the information on the mailing labels to user information in user data 502, and finds the user information that matches the mailing labels. In at least one embodiment, user locator 504 sends the information identified and retrieved from user data 502 to server 120 to update intended recipient data 402, or to register the intended recipients in server 120. In at least one embodiment, user locator 504 retrieves contact information of the identified intended recipients and automatically sends notifications to the intended recipients when items are waiting to be picked up.

Figure 6A:
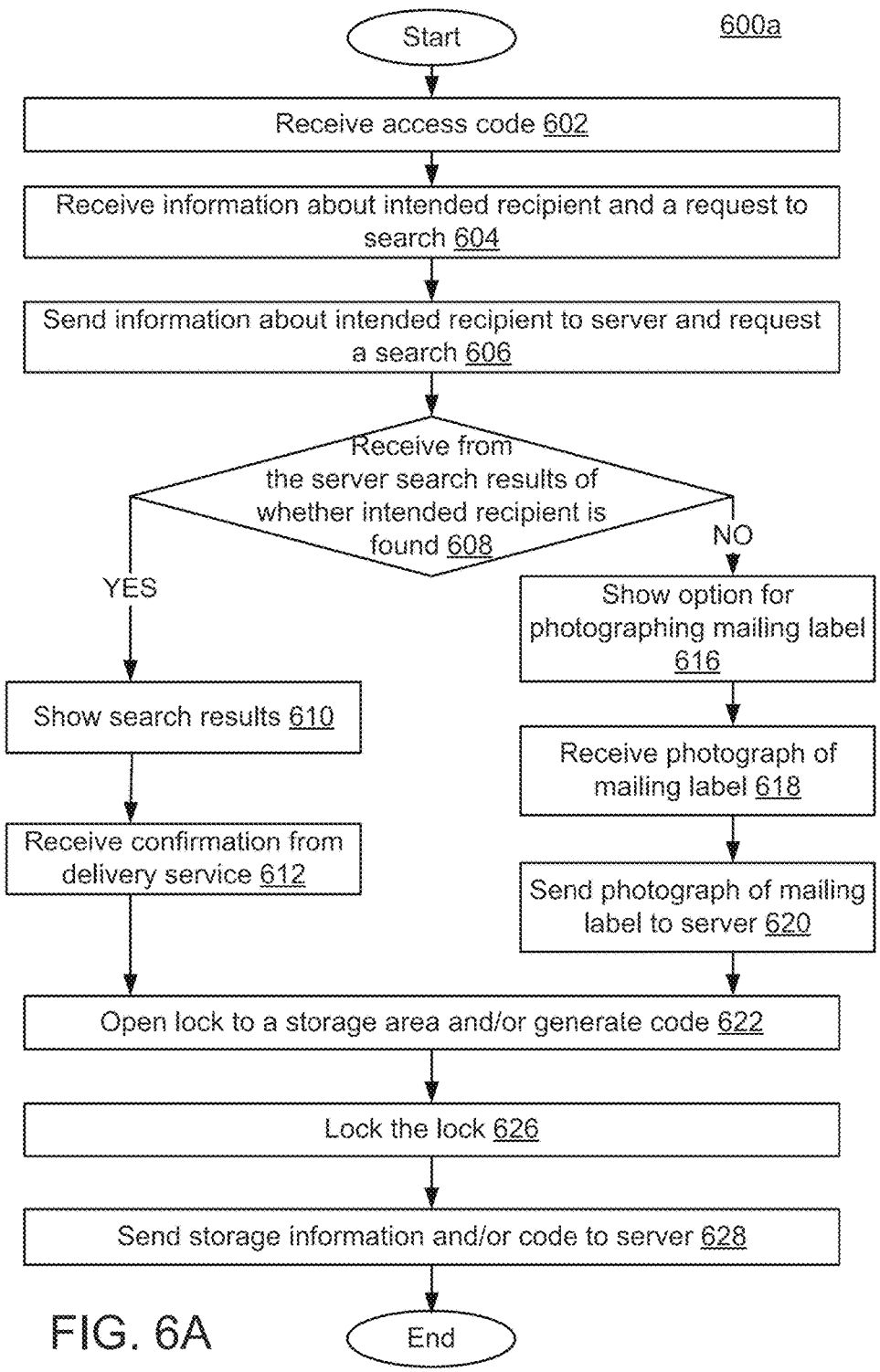
FIG. 6A shows a flowchart of an embodiment of a method for handling items delivered by the delivery service of FIG. 1, which may be performed by the storage terminal of FIG. 1.

FIG. 6A shows a flowchart of an embodiment of a method 600*a* for handling items delivery by the delivery service 130 of FIG. 1, which may be performed by the storage terminal 115 of FIG.1.

In step 602, an access code is received at storage terminal 115, which may be entered by delivery service 130.

In step 604, information about intended recipient 150, such as intended recipient name, is received at storage terminal 115 with an inquiry to search for the intended recipient 150 in the system 100.

In step 606, the information about the intended recipient 150 is sent from storage terminal 115 to server 120 with a request to perform a search in intended recipient data 402 of server 120.

In step 608, search results are received at storage terminal 115 from server 120. If the intended recipient 150 is registered to system 100 and found in intended recipient data 402, the search results include information about the intended recipient 150, or information about each intended recipient if more than one intended recipient is registered with the same name. If intended recipient 150 is not found in intended recipient data 402, a message (e.g., "intended recipient not found") is received at storage terminal 115.

In optional step 610, if information about the intended recipient 150 is found in server 120, the search results are displayed at storage terminal 115 or on the handheld device of the delivery service 130. Optionally, more than one intended recipient 150 may be found in server 120 who are registered with the same name.

In optional step 612, a confirmation is received at storage terminal 115 about the intended recipient 150 to deliver the item by delivery service 130. If more than one intended recipient 150 is found, delivery service 130 may selected the intended recipient 150 associated with the item based on other information displayed, such as telephone numbers, addresses, etc.

In step 616, if the intended recipient 150 is not found in server 120, options may be shown at storage terminal 115 for photographing the mailing label of the item using camera 116 or 316. Alternatively, another option allows the delivery service 130 to enter information about the intended recipient 150 or mailing label information via storage terminal 115. Optionally, a message such as "customer not found" may be displayed at storage terminal 115 before or simultaneously while providing the options.

In step 618, a photograph of the mailing label and/or information entered by delivery service 130 is received at storage terminal 115.

In step 620, the photograph of the mailing label and/or information entered by delivery service 130 is uploaded from storage terminal 115 to server 120.

In step 622, a lock to one of the storage areas 111*a-n* is opened by storage terminal 115. Optionally, a code is generated by storage terminal 115, which code may be used to open the lock and access the same storage area by the intended recipient 150.

In optional step 626, the lock to the storage area is locked by storage terminal 115. Alternatively, the lock may be locked by the delivery service 130.

In step 628, storage information including a storage identifier is sent by storage terminal 114 to server 120. Optionally the code generated by storage terminal 115 is also sent to server 120.

In an embodiment, each of the steps of method 600*a* is a distinct step. In at least one embodiment, although depicted as distinct steps in FIG. 6A, steps 602-628 may not be distinct steps. In other embodiments, method 600*a* may not have all of the above steps and/or may have other steps in addition to or instead of those listed above. The steps of method 600*a* may be performed in another order. Subsets of the steps listed above as part of method 600*a* may be used to form their own method.

Figure 6B:
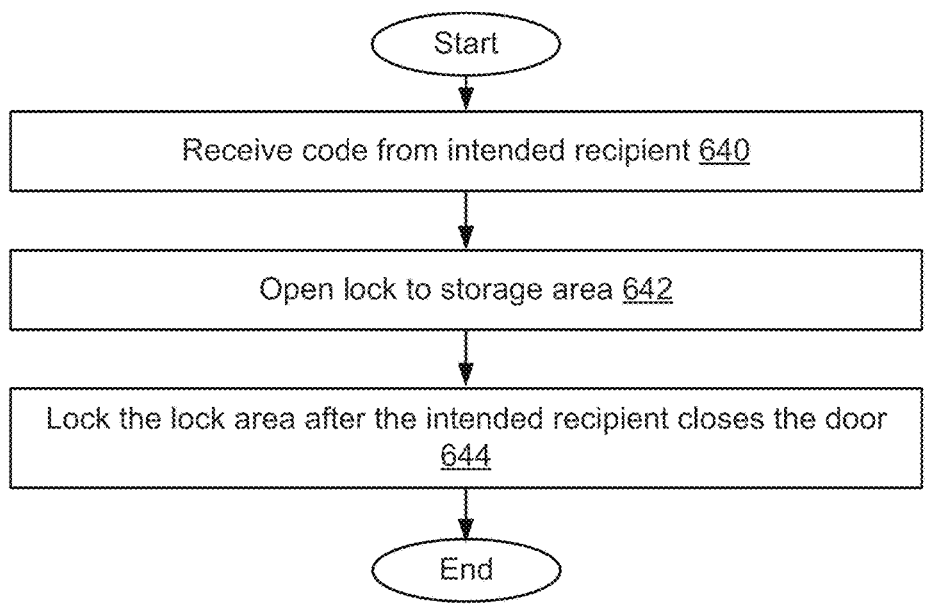
FIG. 6B shows a flowchart of an embodiment of a method for handling items to be picked up by an intended recipient, which may be performed by the storage terminal of FIG. 1.

FIG. 6B shows a flowchart of an embodiment of a method 600*b* for handling items to be picked up by an intended recipient, which may be performed by the storage terminal 115 of FIG.1.

In step 640, a code is received at storage terminal 115, optionally entered by an intended recipient 150 (whom earlier received the code and a notification that an item was waiting to be picked up). Optionally, step 640 also includes receiving a signature or other forms of identification of the intended recipient 150, if the delivery service requested a signature, for example.

In step 642, a lock to a storage terminal that matches the code and stores the item associated with the intended recipient 150 is opened by storage terminal 115.

In optional step 644, the lock to the same storage area is locked by storage terminal 115 after the intended recipient 150 closes the door of the storage area.

In an embodiment, each of the steps of method 600*b* is a distinct step. In at least one embodiment, although depicted as distinct steps in FIG. 6B, steps 640-644 may not be distinct steps. In other embodiments, method 600*b* may not have all of the above steps and/or may have other steps in addition to or instead of those listed above. The steps of method 600*b* may be performed in another order. Subsets of the steps listed above as part of method 600*b* may be used to form their own method.

Figure 7:
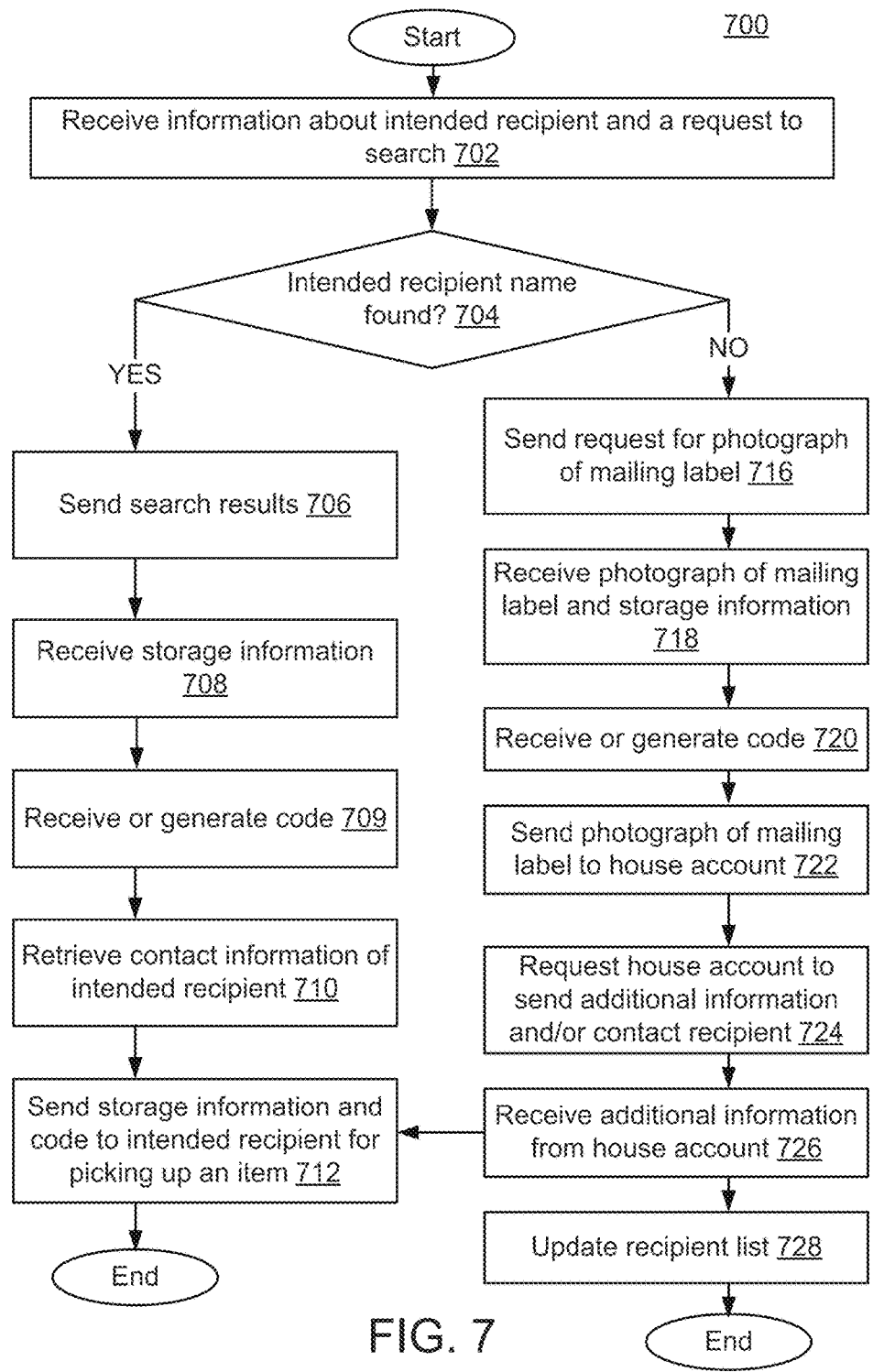
FIG. 7 shows a flowchart of an embodiment of a method for implementing the system of FIG. 1, which may be performed by the server of FIG. 1.

FIG. 7 shows a flowchart of an embodiment of a method 700 for implementing the system 100 of FIG. 1, which may be performed by the server 120 of FIG. 1.

In step 702, information about intended recipient 150, such as the intended recipient name, and a request to search is received at server 120 from storage terminal 115 or handheld device of the delivery service 130.

In step 704, a search is performed by server 120. In at least one embodiment, server 120 searches the intended recipient data 402 for intended recipient 150 that has the same intended recipient name provided by the storage terminal 115.

In step 706, if the intended recipient 150 is registered and information about the intended recipient 150 is found in intended recipient data 402 of server 120, the search results are sent from server 120 to storage terminal 115 or handheld device of the delivery service 130. In at least one embodiment, if more than one intended recipient 150 is found with the same name, the search results may include other information for distinguishing between the different intended recipients that have the same name, such as telephone numbers, addresses, etc.

In step 708, storage information including a storage identifier of a storage area that stores the item is received at server 120 from storage terminal 115 or handheld device of the delivery service 130, after the delivery service 130 selects a storage area that is available. In at least one embodiment, delivery service 130 is provided with selections of different sizes of storage areas.

In step 709, a code for accessing the storage area is received at server 120 from storage terminal 115. Alternatively, step 709 includes generating a code to be associated with the storage area by server 120.

In step 710, contact information of the intended recipient 150 is retrieved from intended recipient data 402 of server 120.

In step 712, a notification including the storage information and the code is sent by server 120 to the intended recipient 150 for picking up the item in the storage area.

In step 716, if the intended recipient 150 is not found in the intended recipient data 402 of server 120, a request is sent from server 120 to storage terminal 115 or handheld device of the delivery service 130 for sending a photograph of the mailing label of the item to server 120. Alternatively or in addition, a request is sent to storage terminal 115, which causes storage terminal 115 to instruct the delivery service 130 to enter information regarding the mailing label for intended recipient 150 (e.g., the intended recipient name, tracking information, etc.).

In step 718, the photograph of the mailing label (and/or information entered by delivery service 130) and information about a storage area that stores the item is received at server 120 from storage terminal 115.

In step 720, a code for accessing the storage area is received at server 120 from storage terminal 115. Alternatively, step 720 includes generating a code to be associated with the storage area by server 120.

In step 722, the photograph of the mailing label is sent from server 120 to a house account and/or to manager terminal 161 for identification. Alternatively or in addition, information that is entered by delivery service 130 is sent from server 120 to manager terminal 161. Optionally, step 722 may include identifying the intended recipient based on the photograph of the mailing label by server 120, and sending the identified information about the intended recipient to manager terminal 161 or a house account. For example, the image of the mailing label may be decomposed into letters and numbers by Optical Character Recognizing (OCRing) the image.

In step 724, a request is sent from server 120 to the house account or manager terminal 161 for sending additional information about the intended recipient 150 that is identified and retrieved by manager terminal 161 to server 120. Optionally, step 724 may include requiring manager terminal 161 to contact the intended recipient 150. In at least one embodiment, steps 722 and 724 may be combined into one step—the receipt of the image of the label or other information on the item at server 120 may be treated as a request to send the image of the label and/or other information about the intended recipient 150 to a house account or manager terminal 161.

In step 726, the additional information about the intended recipient 150 identified and retrieved by manager terminal 161 is received at server 120. In at least one embodiment, step 726 is followed by step 712.

In step 728, if intended recipient 150 was not registered, the intended recipient 150 is registered in server 120 with the additional information provided by manager terminal 161. If intended recipient 150 was registered, but under a different name or title, and alias for the intended recipient 150 may be added, so that in the future the intended recipient 150 may be found no matter which name is used. Optionally, step 728 includes obtaining an approval or confirmation from the intended recipient 150 before registering the intended recipient 150 in server 120. Optionally, step 728 includes notifying the intended recipient 150 by the server 120 with newly registered account information.

In an embodiment, each of the steps of method 700 is a distinct step. In at least one embodiment, although depicted as distinct steps in FIG. 7, steps 702-728 may not be distinct steps. In other embodiments, method 700 may not have all of the above steps and/or may have other steps in addition to or instead of those listed above. The steps of method 700 may be performed in another order. Subsets of the steps listed above as part of method 700 may be used to form their own method.

Figure 8:
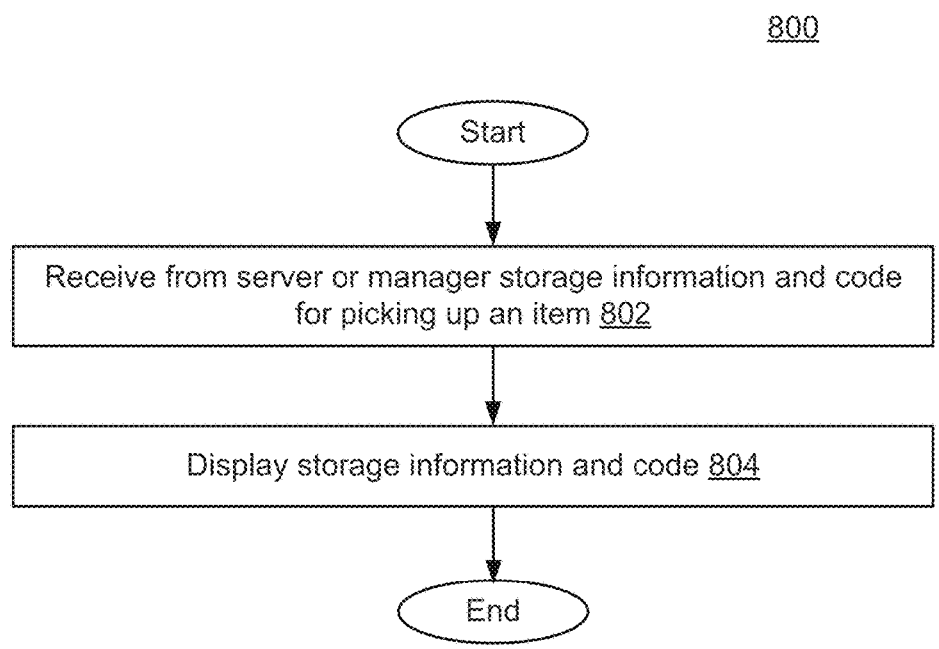
FIG. 8 shows a flowchart of an embodiment of a method for receiving notifications by the intended recipient of FIG. 1.

FIG. 8 shows a flowchart of an embodiment of a method 800 for receiving notifications to intended recipient 150 of FIG. 1, optionally via intended recipient terminal 151, phone 153, and/or mobile terminal 155.

In step 802, storage information and code for picking up an item is received at intended recipient terminal 151, phone 153, and/or mobile terminal 155.

In step 804, the storage information and code is shown optionally via intended recipient terminal 151 or mobile terminal 155, for the intended recipient 150 to view. Optionally, the storage information and code is played as a voice message via phone 153 or mobile terminal 155.

In an embodiment, each of the steps of method 800 is a distinct step. In at least one embodiment, although depicted as distinct steps in FIG. 8, steps 802-804 may not be distinct steps. In other embodiments, method 800 may not have all of the above steps and/or may have other steps in addition to or instead of those listed above. The steps of method 800 may be performed in another order. Subsets of the steps listed above as part of method 800 may be used to form their own method.

Figure 9:
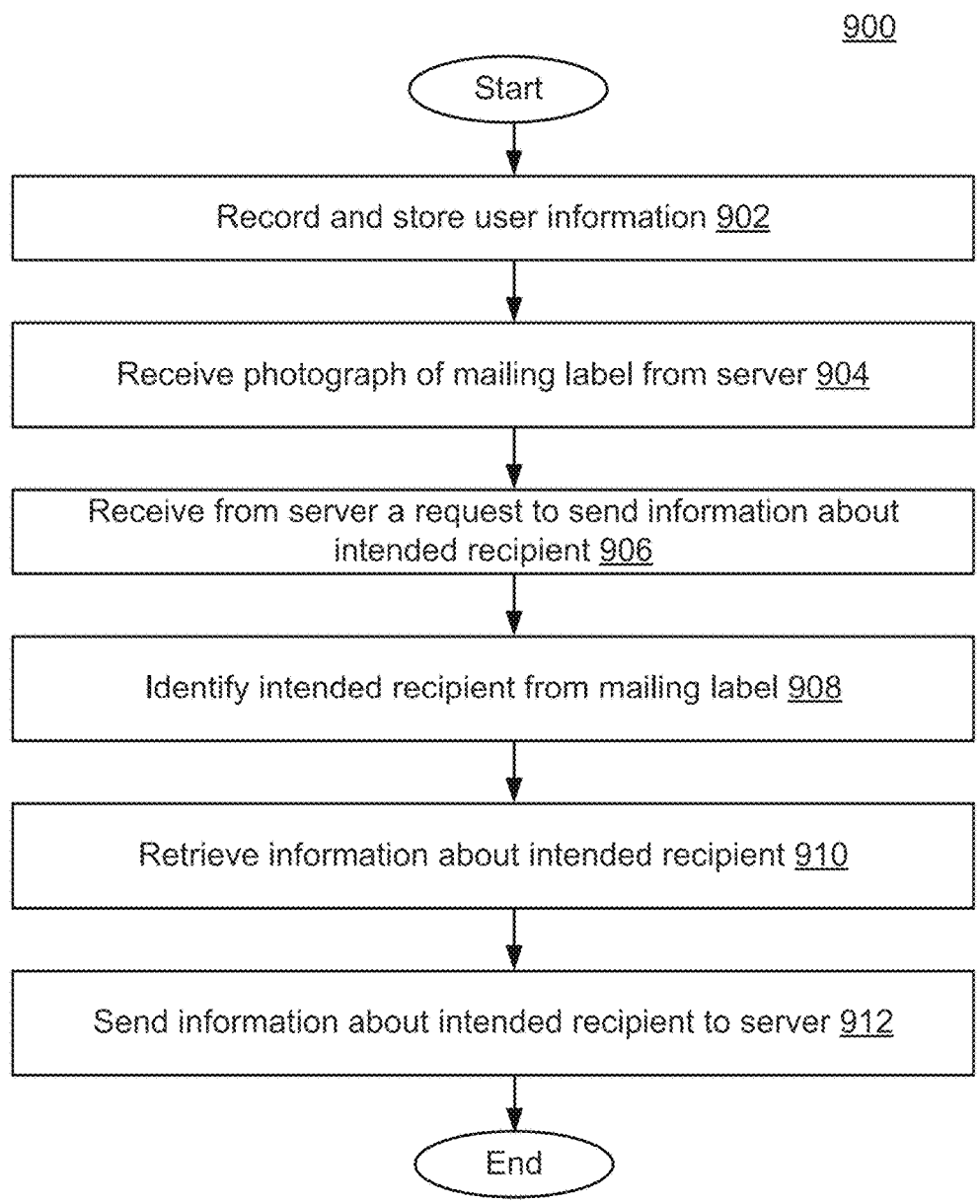
FIG. 9 shows a flowchart of an embodiment of a method for identifying the intended recipient of FIG. 1, which may be performed by the manager terminal of FIG. 1.

FIG. 9 shows a flowchart of an embodiment of a method 900 for identifying the intended recipient 150 of FIG. 1, which may be performed by the manager terminal 161 of FIG. 1.

In step 902, user information of the building or other entity that is managed by manager 160 is recorded and stored at manager terminal 161.

In step 904, a photograph of mailing label is received at manager terminal 161 from server 120. Optionally, information about the intended recipient 150 is also received at manager terminal 161, which is entered by delivery service 130 and uploaded by storage terminal 115 to server 120.

In step 906, an inquiry is received at manager terminal 161 from server 120 to send information about the intended recipient 150.

In step 908, intended recipient 150 is identified by manager terminal 161. Methods of identifying intended recipient 150, which may be used in step 908, were discussed in conjunction with user locator 504 of FIG. 5.

In step 910, information about the intended recipient 150 is retrieved from user data 502 of manager terminal 161.

In step 912, the information about the intended recipient 150 is sent from manager terminal 161 to server 120.

In an embodiment, each of the steps of method 900 is a distinct step. In at least one embodiment, although depicted as distinct steps in FIG. 9, steps 902-912 may not be distinct steps. In other embodiments, method 900 may not have all of the above steps and/or may have other steps in addition to, or instead of, those listed above. The steps of method 900 may be performed in another order. Subsets of the steps listed above as part of method 900 may be used to form their own method.

Figure 10:
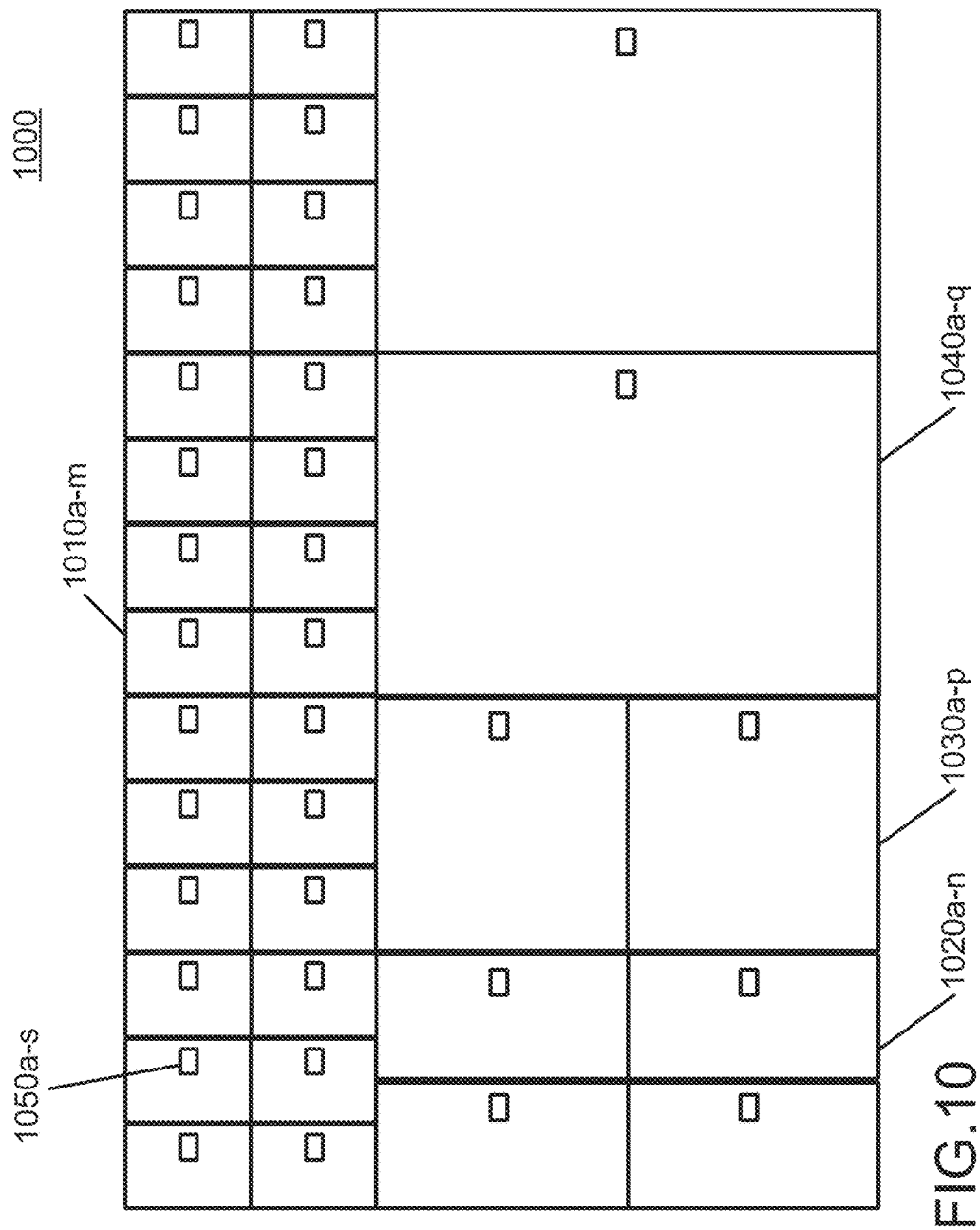
FIG. 10 shows a diagram of an embodiment of the storage areas of different sizes that may be used in the system of FIG. 1.

FIG. 10 shows a diagram 1000 of an embodiment of the storage areas of different sizes that may be used in the system of FIG. 1. FIG. 10 includes at least a set of small storage areas 1010a-m, a set of medium storage areas 1020a-n, a set of large storage areas 1030a-p, a set of oversized storage areas 1040a-q, and locks 1050a-s. In other embodiments, FIG. 10 may not include all of the components listed and/or may include other components in addition to, or instead of, those listed above.

FIG. 10 shows that storage areas of different sizes (e.g., small, medium, large, oversized) may be included in the system 100 for storing items of various sizes. In at least one embodiment, small storage areas 1010a-m, medium storage areas 1020a-n, large storage areas 1030a-p, and oversized storage areas 1040a-q are similar to the storage areas 111a-n described in conjunction with FIG. 1 except that small storage areas 1010a-m, medium storage areas 1020a-n, large storage areas 1030a-p, and oversized storage areas 1040a-q have different sizes and/or shapes. In at least one embodiment, small storage areas 1010a-m, medium storage areas 1020a-n, large storage areas 1030a-p, and oversized storage areas 1040a-q may be stacked and/or physically joined together. In another embodiment, there are spaces or structures separating one storage area from another. In at least one embodiment, the numbers of different sets of storage areas may be different (e.g., there are more small storage areas 1010a-m than oversized storage areas 1040a-q within one storage bank). In another embodiment, a storage bank may include the same number of at least two sets of storage areas (e.g., the number of large storage areas 1030a-p is the same as the oversized storage areas 1040a-q). In other embodiments, the numbers, sizes, and/or shapes of each set of storage areas may vary. In at least one embodiment, each of small storage areas 1010a-m, medium storage areas 1020a-n, large storage areas 1030a-p, and/or oversized storage areas 1040a-q is secured by one of locks 1050a-s that are similar to locks 113a-n discussed in conjunction with FIG. 1. In at least one embodiment, each of small storage areas 1010a-m, medium storage areas 1020a-n, large storage areas 1030a-p, and oversized storage areas 1040a-q is identified via a storage area number. In at least one embodiment, system 100 indicates how many of each set of storage areas are available to use.

In an embodiment, each of small storage areas 1010a-m, medium storage areas 1020a-n, and large storage areas 1030a-p differs from oversized storage areas 1040a-q in access and storage restrictions. At any given time, each storage area of small storage areas 1010a-m, medium storage areas 1020a-n, and large storage areas 1030a-p receives items for only one intended recipient 150. Another intended recipient's items may be placed in a given one storage area of small storage areas 1010a-m, medium storage areas 1020a-n, and large storage areas 1030a-p only after any item of another intended recipient that is in the same storage area is removed. Items belonging to two different intended recipients are not placed in the same storage area within any of small storage areas 1010a-m, medium storage areas 1020a-n, and large storage areas 1030a-p. In contrast, oversized storage areas 1040a-q may be shared by the items of multiple intended recipients simultaneously. In another embodiment, there may be other storage areas shared by the items of two intended recipients simultaneously. There may be some of small storage areas 1010a-m, medium storage areas 1020a-n, and large storage areas 1030a-p that are designated as shared areas, and that are therefore shared by the items of multiple intended recipients simultaneously and others that are not (and are reserved for use of only one intended recipient at-a-time).

Figure 11:
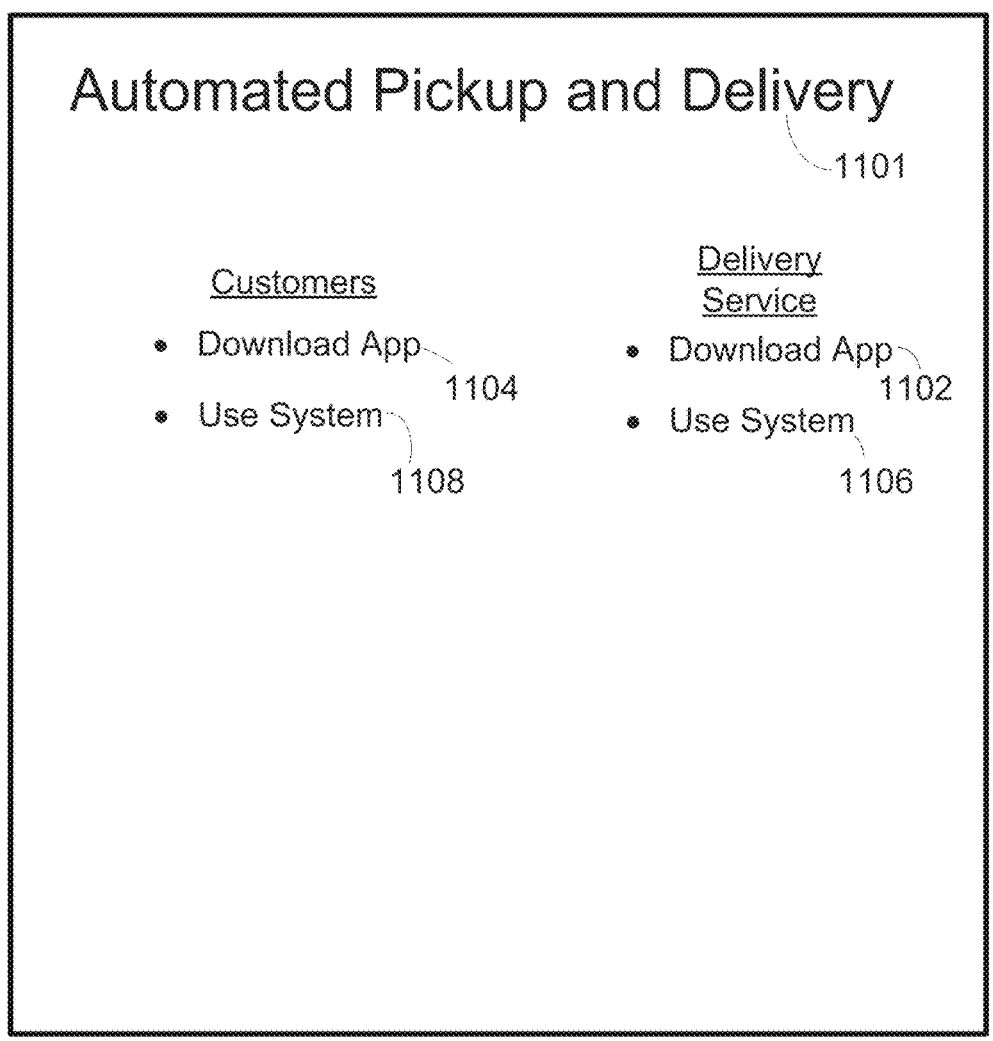
FIG. 11 is a diagram of an example of a web page for downloading an application or accessing the system of FIG. 1.

FIG. 11 is a diagram of an example of a web page 1100 for downloading an application that may be installed in mobile devices or for accessing system 100 directly via web page 1100. Web page 1100 includes at least a title 1101, a delivery service download link 1102, a customer download link 1104, a delivery service enter system link 1106, and a customer enter system link 1108. In other embodiments, web page 1100 may not include all of the components listed and/or may include other components in addition to or instead of those listed above.

In at least one embodiment, web page 1100 includes a link for the delivery service 130 to download an application that may be installed in handheld devices used by delivery service 130. In at least one embodiment, webpage 1100 includes a link for the intended recipient 150 to download an application that may be installed in mobile terminal 155 used by intended recipient 150. In at least one embodiment, the applications for the delivery service 130 and the intended recipient 150 are different. In at least one embodiment, the delivery service 130 and intended recipient 150 download the same application. However, the application recognize whether the delivery service 130 or intended recipient 150 intends to access the system via the access code or password entered. In at least one embodiment, web page 1100 includes links for delivery service 130 and intended recipient 150 to directly access the system 100 on web page 110 to deliver and pick up items, respectively.

Title 1101 includes plain text showing that the web page 1100 is for access a storage system as discussed in conjunction with system 100. Delivery service download link 1102 is a link to a page for the delivery service 130 to download an application to the handheld devices of delivery service 130 for accessing system 100 in order to deliver items to storage bank 110. Customer download link 1104 is a link to a page for the intended recipient 150 to download an application to the mobile terminal 155 for accessing system 100 in order to pick up an item. Delivery service entry system link 1106 is a link to a page for the delivery service 130 to directly access system 100, via a website rather than using the application. Customer entry system link 1108 is a link to a page for the intended recipient 150 to directly access webpages for system 100 instead of using the application.

Screenshots

Figure 12:
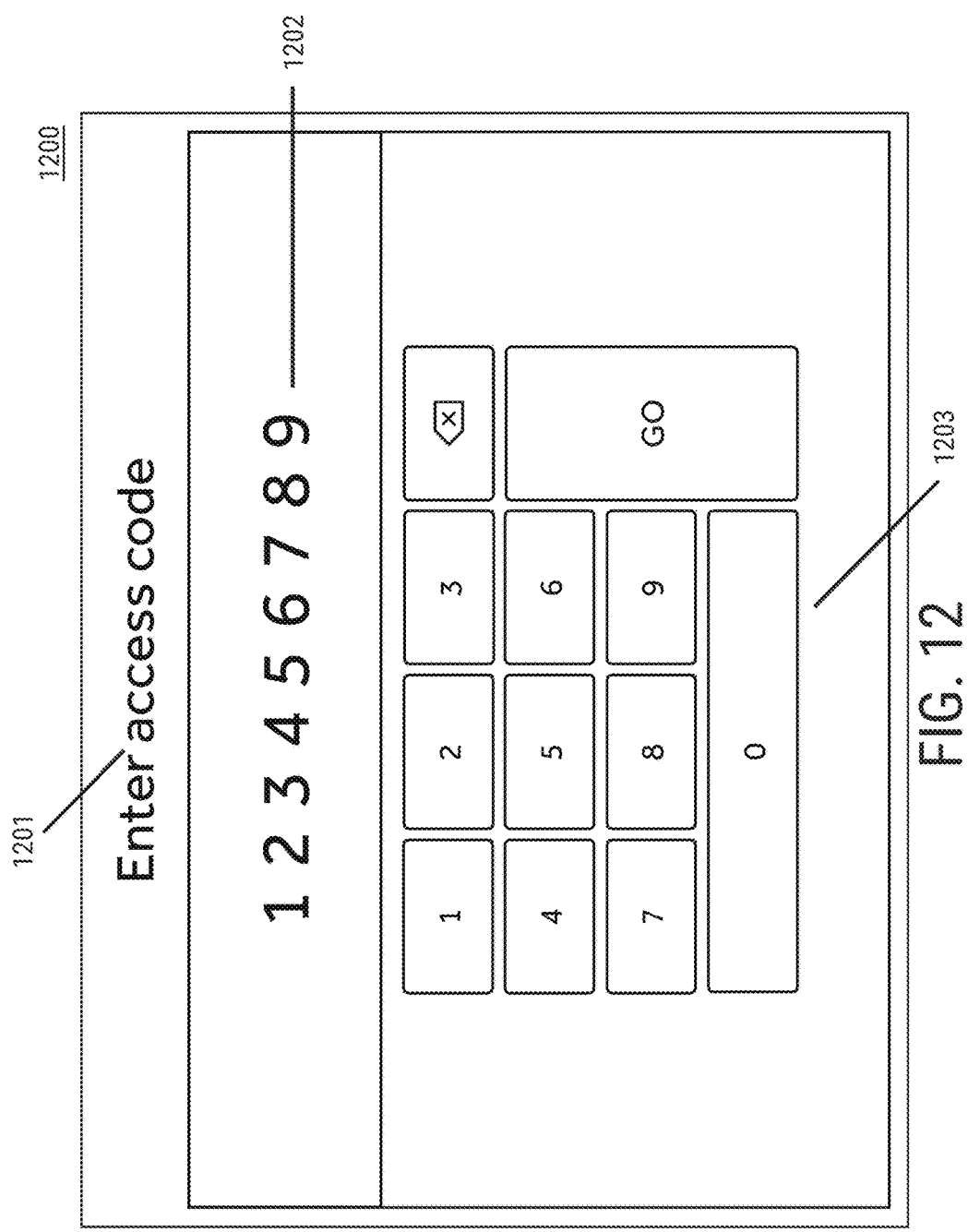
FIG. 12 is a screenshot of an example of a page for the delivery service of FIG. 1 to enter access code.

FIG. 12 is a screenshot of an example of a page 1200 for delivery service 130 to enter access code. Page 1200 includes at least instruction 1201, text field 1202, and keypad 1203. In other embodiments, page 1200 may not include all of the components listed and/or may include other components in addition to or instead of those listed above.

Instruction 1201 includes plain text indicating that the page 1200 is for entering access code. Text field 1202 displays the access code that is entered by the delivery service 130. The user enters the access code into text field 1202. Keypad 1203 is a keypad shown on a touch screen for the delivery service 130 to enter the access code. In at least one embodiment, keypad 1203 includes a numeric keypad including numbers 0 to 9, a delete key and an enter key (e.g., the key labeled with text "GO"). In other embodiments, keypad 1203 may include a representation of a standard computer keyboard or other combinations of keys. In at least one embodiment, the delivery service 130 enter the access code via keypad 1203 and press the enter key to access system 100 if the access code is successfully authenticated by server 120.

Figure 13:
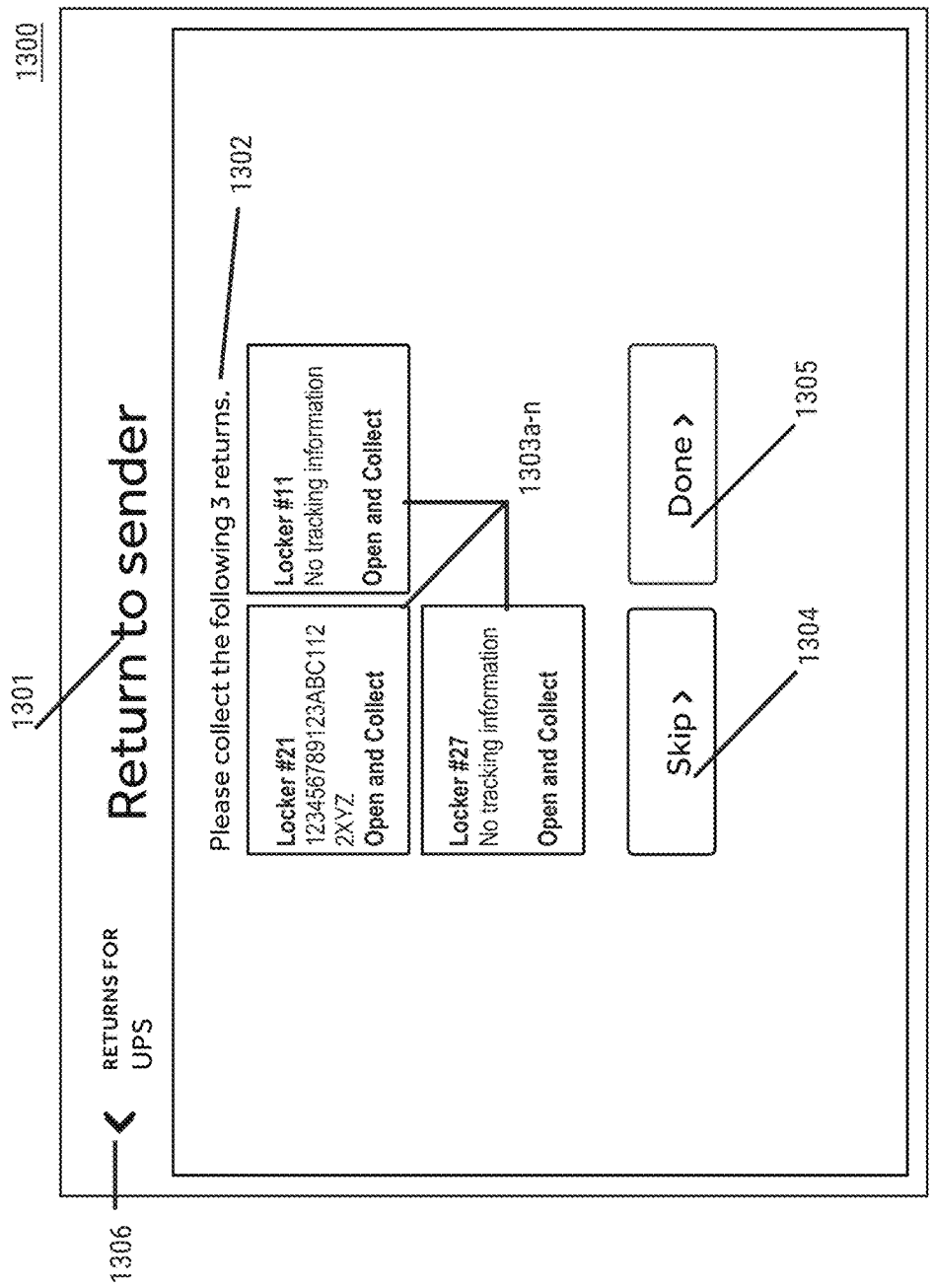
FIG. 13 is a screenshot of an example of a page showing unclaimed items for the delivery service to collect and return to the senders.

FIG. 13 is a screenshot of an example of a page 1300 showing unclaimed items for delivery service 130 to collect and return to the senders. Page 1300 includes at least title 1301, instructions 1302, return information 1303a-n, skip key 1304, done key 1305, and return link 1306. In other embodiments, page 1300 may not include all of the components listed and/or may include other components in addition to or instead of those listed above.

In at least one embodiment, page 1300 presents an interface that the delivery service 130 interacts with when collecting items that have been returned to the delivery service 130. Optionally, a similar page may be used for picking up items that were delivered a while ago, but have not been picked up by the recipients for an extended period of time. The delivery service 130 may select the items to collect and return to the senders, or may skip to proceed with new deliveries.

Title 1301 includes plain text showing that the page 1300 is for the delivery service 130 to collect returned or unclaimed items from the storage areas. The delivery service may then return the items to the senders. Instructions 1302 includes text showing the number of returns.

Return information 1303a-n includes links with texts showing the storage area numbers (e.g., locker number in FIG. 13), the tracking numbers (if available) of the items that have been returned or have not been picked up by the recipients. Sections 1303a-n includes information for opening the locks and collecting the items. In at least one embodiment, the delivery service 130 may select the items by clicking on the return information 1303a-n, which may cause the system 100 to unlock the corresponding storage areas so that the delivery service 130 may pick up the items. In at least one embodiment, the section selected, after being clicked by delivery service 130, displays a message showing that the item was picked up by the delivery service 130, and the item information and/or storage information is updated in the server 120.

Skip key 1304 is a key (e.g., the key labeled "Skip>"), which when selected by the delivery service 130, causes storage system 115 to skip the steps associated with collecting the returned and/or unclaimed items. In at least one embodiment, delivery service 130 may skip collecting items and go to the page for searching the intended recipients. Done key 1305 is a key (e.g., the key labeled "Done>"), which when selected by the delivery service 130 confirms that the delivery service has collected all or some of the returned or unclaimed items. In at least one embodiment, done key 1305 cannot be selected until all of the returned or unclaimed items have been collected by the delivery service 130. In at least one embodiment, after collecting all the returned and/or unclaimed items and selecting the done key 1305, system 100 updates records pertaining to the items retrieved by delivery service 130, so that the records reflect the current status of the retrieved items. Return link 1306 is a link to a page for searching an intended recipient.

Figure 14:
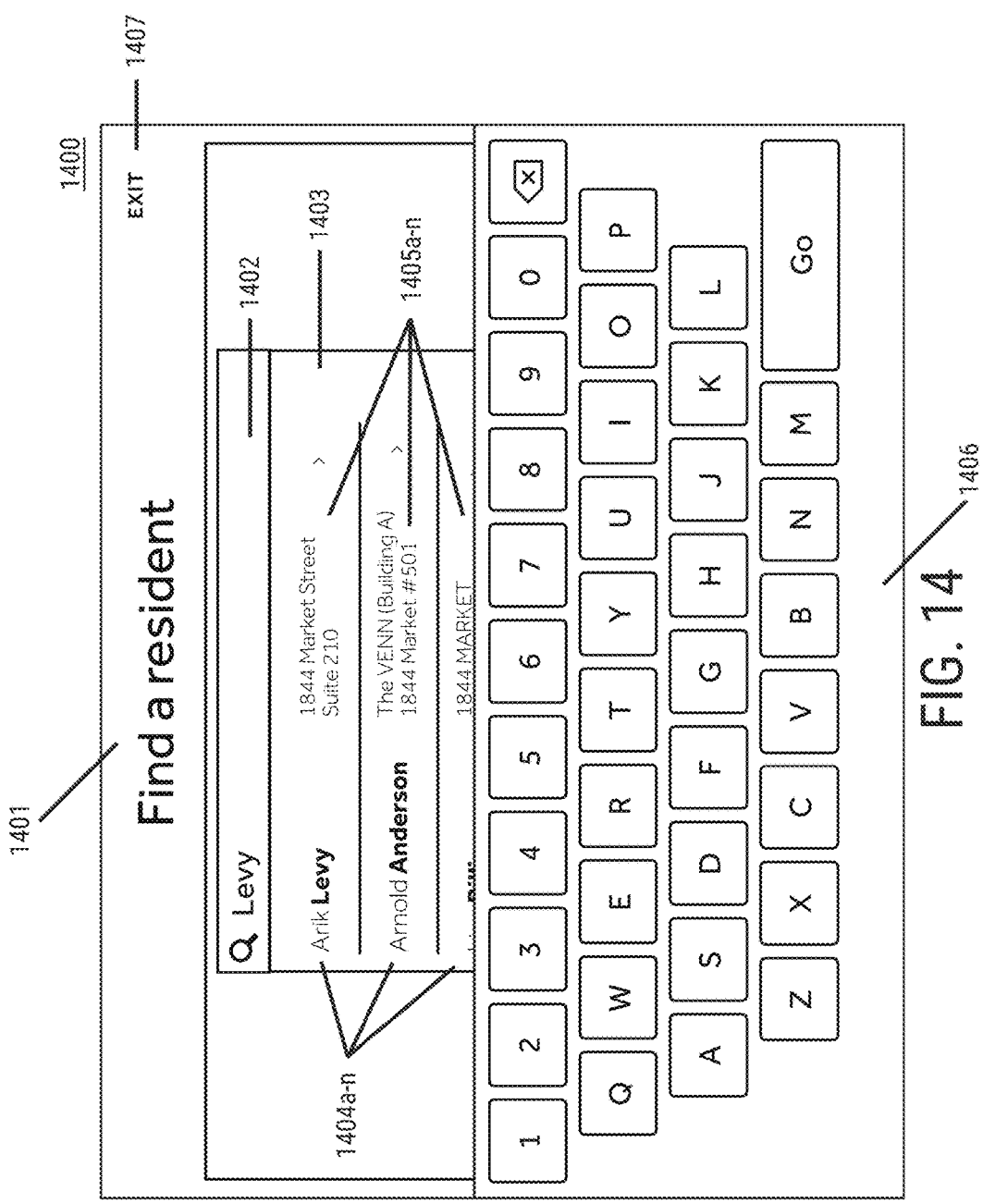
FIG. 14 is a screenshot of an example of a page for the delivery service to search for an intended recipient.

FIG. 14 is a screenshot of an example of a page 1400 for delivery service 130 to search for an intended recipient 150. Page 1400 includes at least title 1401, a search field 1402, search results section 1403, names 1404a-n, addresses 1405a-n, keyboard 1406, and exit link 1407. In other embodiments, page 1400 may not include all of the components listed and/or may include other components in addition to or instead of those listed above.

In at least one embodiment, page 1400 presents an interface that the delivery service 130 interacts with for searching for an intended recipient by entering the name of the intended recipient and select from a list of search results.

Title 1401 includes plain text showing that the page 1400 is for finding an intended recipient (or finding a resident as shown in FIG. 14). Search field 1402 is a field for entering intended recipient name via a keyboard on the touch screen. Search results section 1403 is a section of the search results, or a drop-down list associated with the search results. The search results are based on the intended recipient name that has been entered by the delivery service 130. In at least one embodiment, the search results are retrieved from the server 120 and displayed in page 1400 in a list. In at least one embodiment, the search results include names 1404a-n, addresses 1405a-n, and/or other information about the intended recipients who have registered with the server 120. In at least one embodiment, the delivery service 130 may select from the search results of the intended recipient that matches the mailing label of the item. Keyboard 1406 is a representation of keyboard on the touch screen for the delivery service 130 to enter information about the intended recipient. Exit link 1407 is a link on the top right corner for returning to the home page as shown in FIG. 11.

Figure 15:
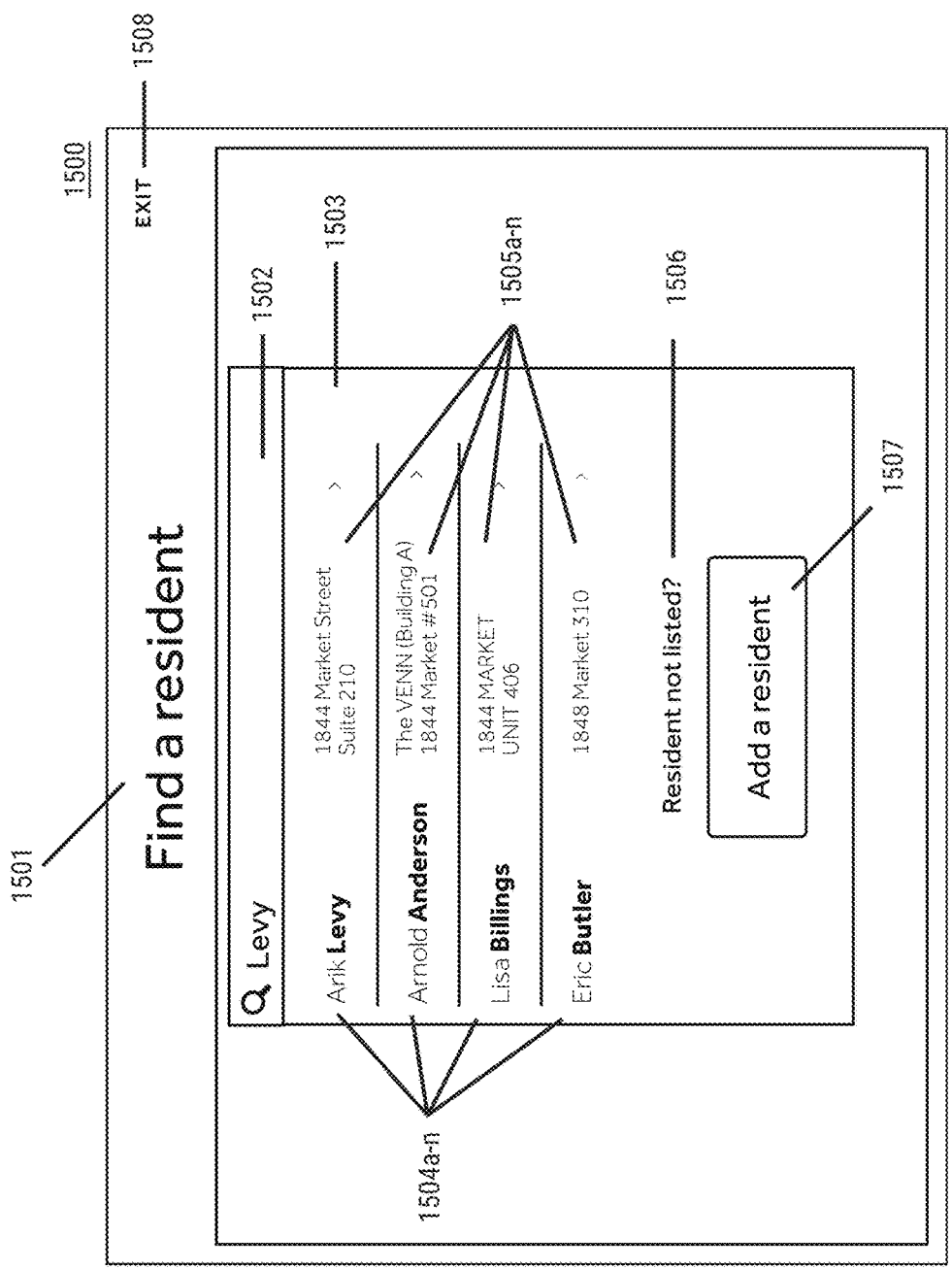
FIG. 15 is a screenshot of an example of a page for the delivery service to select an intended recipient from the search results or an option to add an intended recipient if the recipient is not found in the search results.

FIG. 15 is a screenshot of an example of a page 1500 for delivery service 130 to select an intended recipient from the search results or an option to add an intended recipient if the recipient is not found in the search results. Page 1500 includes at least title 1501, a search field 1502, search results section 1503, names 1504a-n, addresses 1505a-n, and exit link 1508, which are the same as title 1401, search field 1402, search results section 1403, names 1404a-n, addresses 1405a-n, and exit link 1407 as discussed in conjunction with FIG. 14. Page 1500 may further include instruction 1506 and add recipient link 1507. In other embodiments, page 1500 may not include all of the components listed and/or may include other components in addition to or instead of those listed above.

In at least one embodiment, page 1500 presents an interface for the delivery service 130 to select an intended recipient from the search results, or to select the option to add an intended recipient if the recipient of the item is not found in the search results. Instruction 1506 is text indicating how to add a recipient to the list of recipients. In the example, of FIG. 15, instruction 1506 is a question asking whether the recipient could not be found. Placing this question above a link labeled with an indication that by selecting the link the user may add a recipient, clarifies to the delivery service 130 how to add a recipient and when it may be desirable to add a recipient. In the example of FIG. 15, instruction 1506 is "Can't find resident?," because in the example of FIG. 15 the recipient is a resident of the building within which storage bank 110 is located. Add recipient link 1507 is a link to a page for adding a recipient. In the example of FIG. 15, add recipient link 1507 is labeled "Add resident," because the recipient is a resident of the building hosting the storage bank 110.

Figure 16:
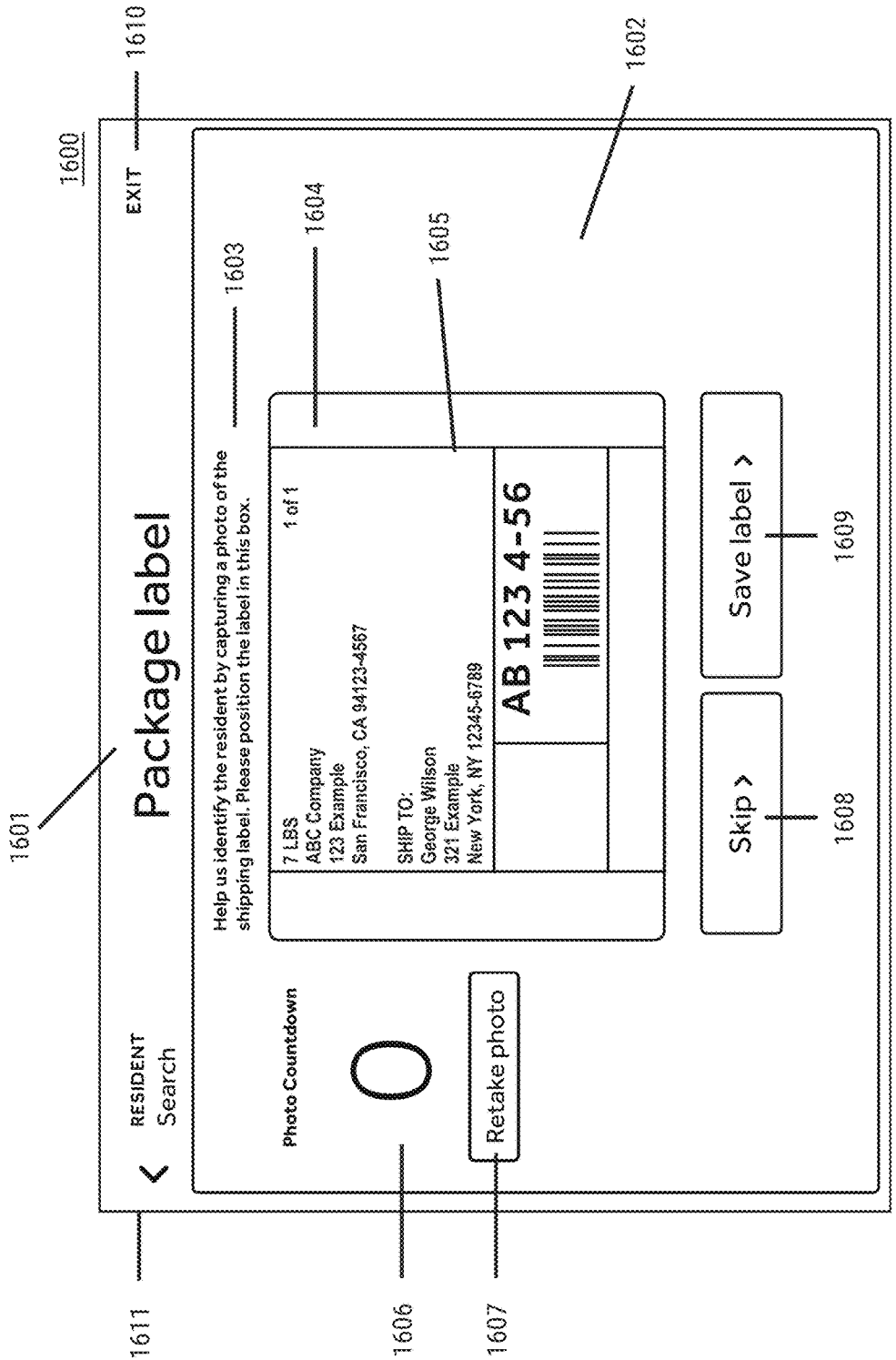
FIG. 16 is a screenshot of an example of a page for the delivery service to photograph the mailing label of the item via a camera.

FIG. 16 is a screenshot of an example of a page 1600 for delivery service 130 to photograph the mailing label of the item via a camera. Page 1600 includes at least title 1601, camera view 1602, instructions 1603, box 1604, mailing label 1605, photo countdown section 1606, retake photo link 1607, skip link 1608, save label link 1609, exit link 1610, and prior page link 1611. In other embodiments, page 1600 may not include all of the components listed and/or may include other components in addition to or instead of those listed above.

In at least one embodiment, page 1600 presents an interface for the delivery service 130 to photograph the mailing label of the item if the recipient cannot be found in the system 100. Title 1601 includes text (as the title) indicating that page 1600 is for recording the item label. Camera view 1602 is a view of the item using the camera when the delivery service 130 places the item in a proper position so that the mailing label appears in a box in the camera view 1602. In at least one embodiment, camera view 1602 is taken by a camera that is installed in the handheld devices used by the delivery service 130. In an alternative embodiment, a camera linked to storage terminal 115 may be used to photograph the label on the item. Instructions 1603 is text instructing the delivery service 130 or suggesting to the delivery service 130 to take a photo of the mailing label. Box 1604 is a box outlining part of the camera view within which the mailing label of the item needs to be placed in order to take a photo of the mailing label. Mailing label 1605 is a mailing label on the item, which may include mailing information such as the sender, the recipient, one or more barcodes, a tracking number, delivery service, and/or the delivery method (e.g., UPS GROUND), etc. Photo countdown section 1606 is a section with numbers counting down (e.g., from 5 to 0) indicating how many seconds are left until a photo is taken by the camera. In at least one embodiment, the photo countdown section 1606 shows the amount of time remaining that the delivery service 130 needs continue to keep the mailing label positioned so as to be viewable in the box 1604 before a photo will be taken. Retake link 1607 is a link for reactivating the camera to take another photo in case the previous photo is not satisfactory (e.g., in case the mailing label is not within the box 1604 and/or the photo is blurry). In an embodiment, placing the item with the mailing label in the box automatically activates the countdown and the taking of the photograph that follows. Skip link 1608 is a link to skip the step of photographing the mailing label. Save label link 1609 is a link to save the photograph of the mailing label after taken by the camera. Exit link 1610 is the same as the exit link 1407 that was discussed in conjunction with FIG. 14. Prior page link 1611 is a link back to page 1400.

Figure 17:
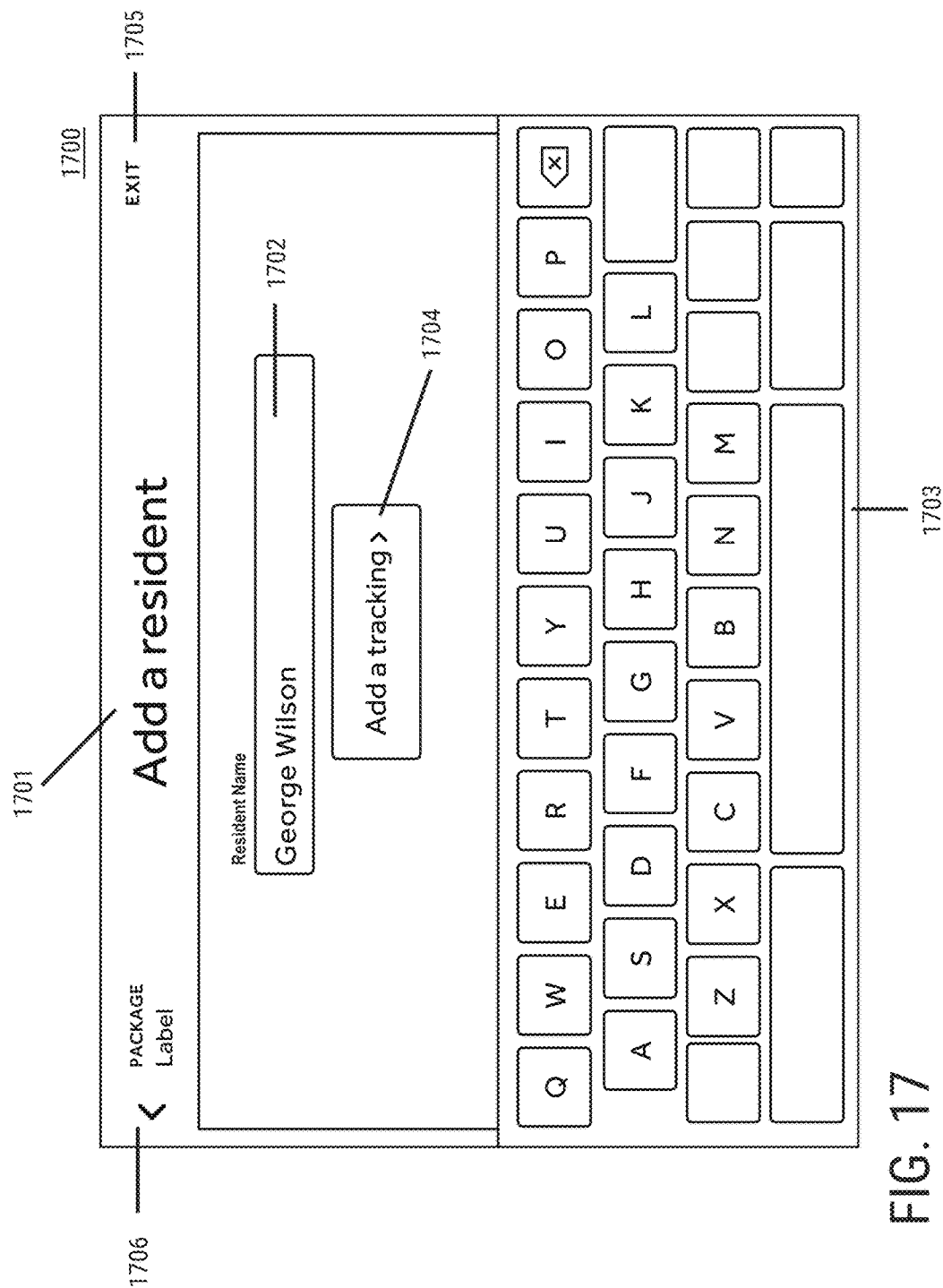
FIG. 17 is a screenshot of an example of a page for the delivery service to enter the name of the recipient.

FIG. 17 is a screenshot of an example of a page 1700 for delivery service 130 to enter the name of the recipient. Page 1700 includes at least title 1701, a field 1702, keyboard 1703, add tracking link 1704, an exit link 1705, and a prior page link 1706. In other embodiments, page 1700 may not include all of the components listed and/or may include other components in addition to or instead of those listed above.

In at least one embodiment, page 1700 includes fields and a virtual keyboard for the delivery service 130 to enter recipient's name in case the recipient is not found in the search results shown in page 1500. Title 1701 is text showing that page 1700 is for adding a recipient. In the example of FIG. 17, title 1701 is "Add a resident," because in the example of FIG. 17, the resident is the recipient. Field 1702 is for entering the name of the recipient shown on the mailing label. Keyboard 1703 may be similar to the keyboard 1406 as discussed in conjunction with FIG. 14 except that in page 1700, key board 1703 is used for entering the name of a recipient that was not previously on the list of recipients. Add tracking link 1704 is a link to a page for adding tracking number of the item. Exit link 1705 may be the same as the exit link 1407 as discussed in conjunction with FIG. 14. Prior page link 1706 is a link back to the page 1600.

Figure 18:
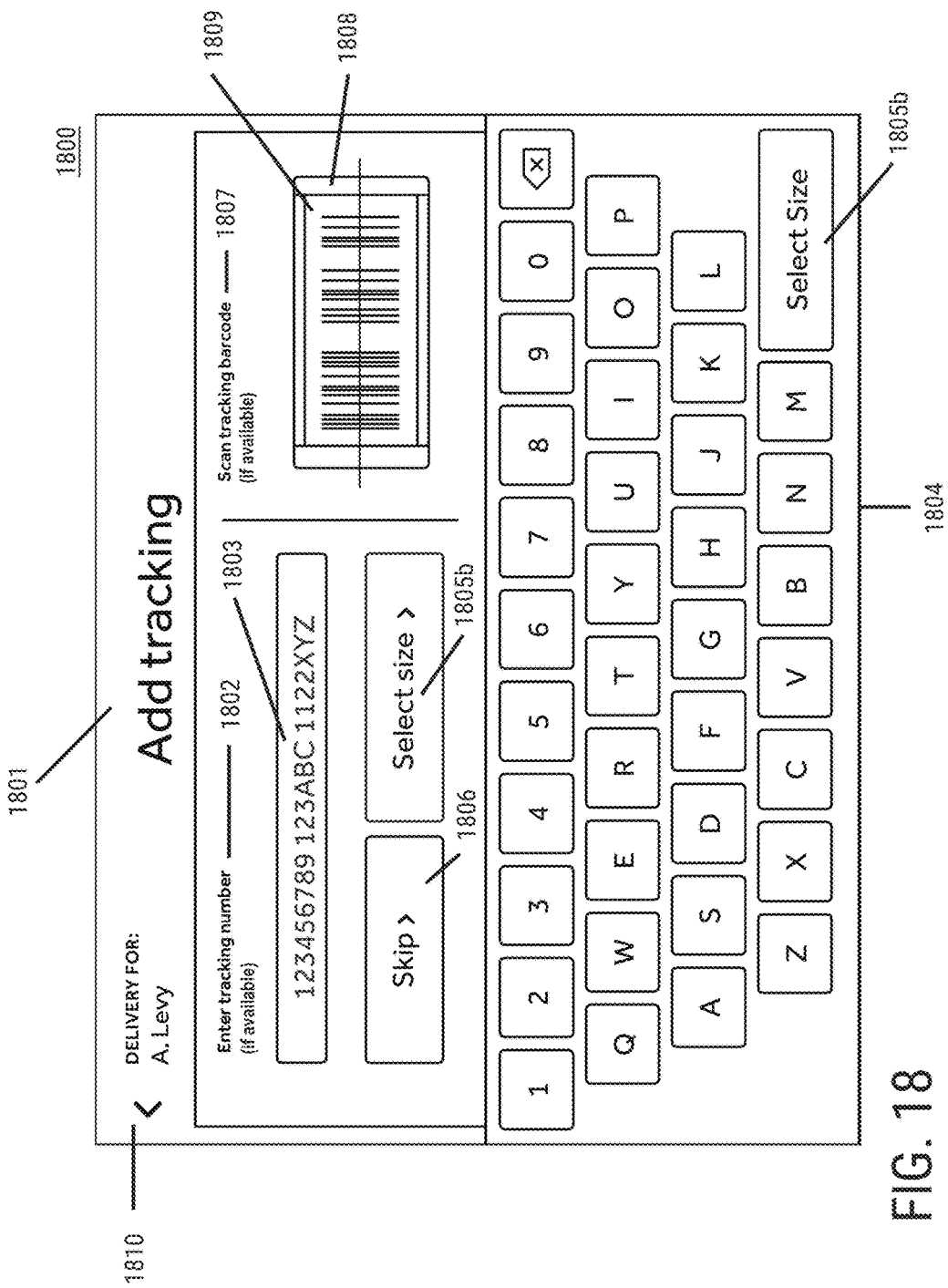
FIG. 18 is a screenshot of an example of a page for the delivery service to add tracking information of the item.

FIG. 18 is a screenshot of an example of a page 1800 for delivery service 130 to add tracking information of the item. Page 1800 includes at least title 1801, instruction 1802, field 1803, keyboard 1804, select size links 1805a and 1805b, skip link 1805, instruction 1807, image 1808, barcode 1809, and prior page link 1810. In other embodiments, page 1800 may not include all of the components listed and/or may include other components in addition to or instead of those listed above.

In at least one embodiment, page 1800 includes fields and a virtual keyboard for the delivery service 130 to add tracking information in addition to adding the intended recipient name in page 1700. Title 1801 is text showing page 1800 is for adding tracking information. Instruction 1802 is text showing that tracking number may be entered in field 1803. Keyboard 1804 may be similar to the keyboard 1406 as discussed in conjunction with FIG. 14, except that keyboard 1804 is used for entering tracking information. Select size links 1805a and 1805b are links, which when selected, bring the user to a page to select a size of the storage area. In the example of FIG. 18, select size links 1805a and 1805b are located in the keyboard 1804 and under the field 1803, respectively. Skip link 1805 is a link to skip the step of entering tracking information. Instruction 1807 is text indicating that a tracking barcode may be scanned, if available. In an embodiment, storage system 115 includes a barcode scanner. Alternatively, delivery service 130 may use handheld devices with barcode scanners and/or may photograph the barcode (or otherwise use the camera on the handheld device of the delivery service 130 to scan the barcode). Image 1808 shows an example of a barcode 1809 on the mailing label. Prior page link 1810 is a link back to page 1700.

Figure 19:
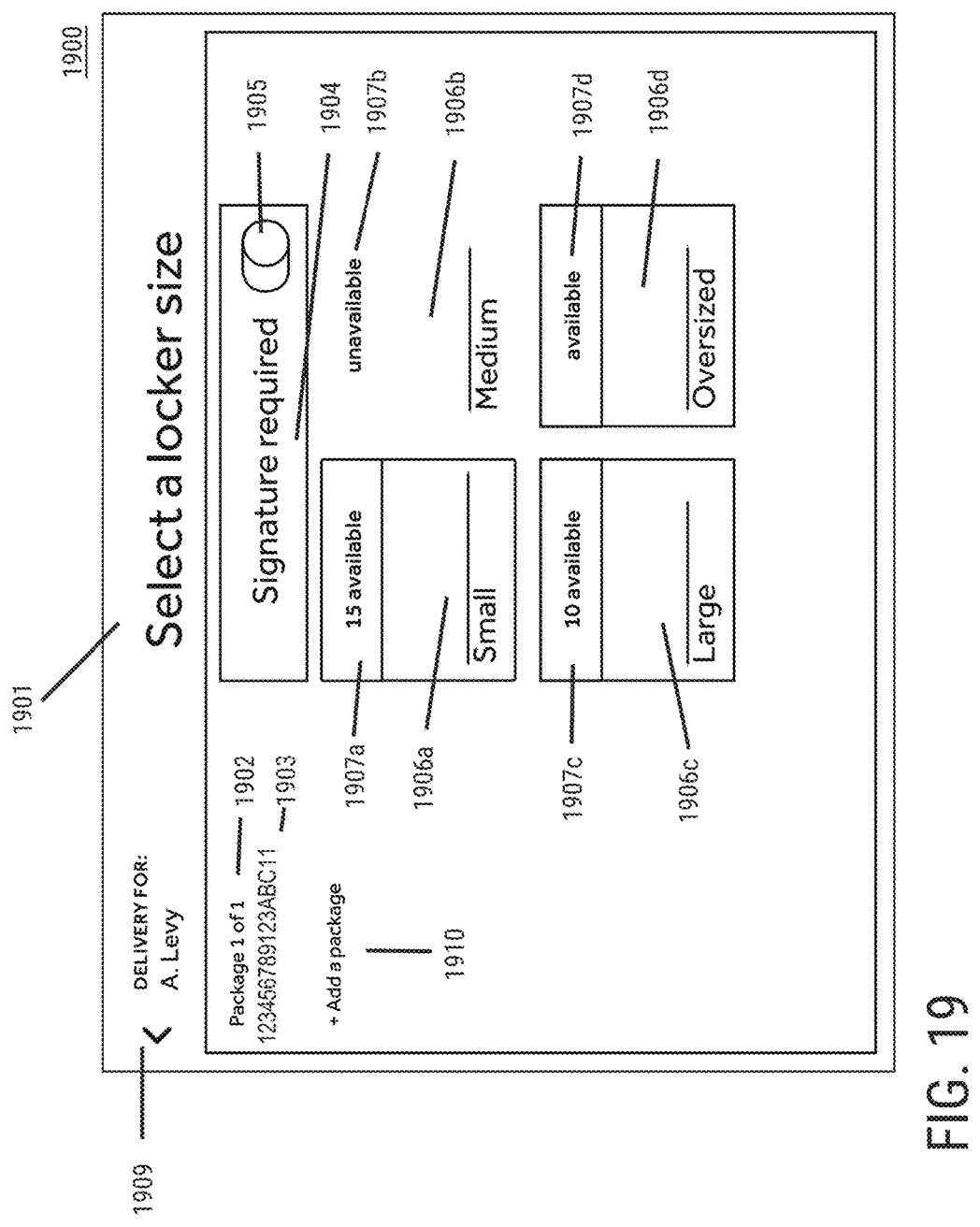

FIG. 19 is a screenshot of an example of a page 1900 for delivery service 130 to select an option if a signature is required and to choose the size of storage area to deposit the item. Page 1900 includes at least title 1901, item number 1902, tracking number 1903, signature selection section 1904, selection icon 1905, storage selection sections 1906a-d, availability indicators 1907a-d, prior page link 1909, and add item link 1910. In other embodiments, page 1900 may not include all of the components listed and/or may include other components in addition to or instead of those listed above.

In at least one embodiment, page 1900 presents an interface for the delivery service 130 to select whether a signature is required prior to unlock the storage area, and what size of the storage area to deposit the item. In at least one embodiment, page 1900 also includes a link for the delivery service 130 to add another item to the same recipient.

Title 1901 is text showing that a storage size may be selected. Item number 1902 is text indicating the number of items to be delivered to the recipient. In an embodiment, item number 1902 indicates the total number of items that are being delivered to a recipient and which item of the total number items the current item is. Tracking number 1903 shows the tracking number of one of the items. Signature selection section 1904 is a section with options for delivery service 130 to choose whether a signature is required from the recipient prior to unlocking the storage area for picking up the item in the storage area. Selection icon 1905 is a selectable icon, which when selected causes storage system 115 to require signature from the recipient. Storage selection sections 1906*a-d* are four sections having links, which when selected by the delivery service 130 determine the size of the storage area that the storage system 115 opens for delivery service 130 to place a particular item. In at least one embodiment, storage selection sections 1906*a-d* include text showing the sizes of the storage areas available and a link to select the desired size. Availability indicators 1907*a-d* are texts showing the number of available storage areas of different sizes in storage selection sections 1906*a-d*. Prior page link 1909 is a link back to the page 1700. Add item link 1910 is a link to add more items to the same recipient.

Figure 20:
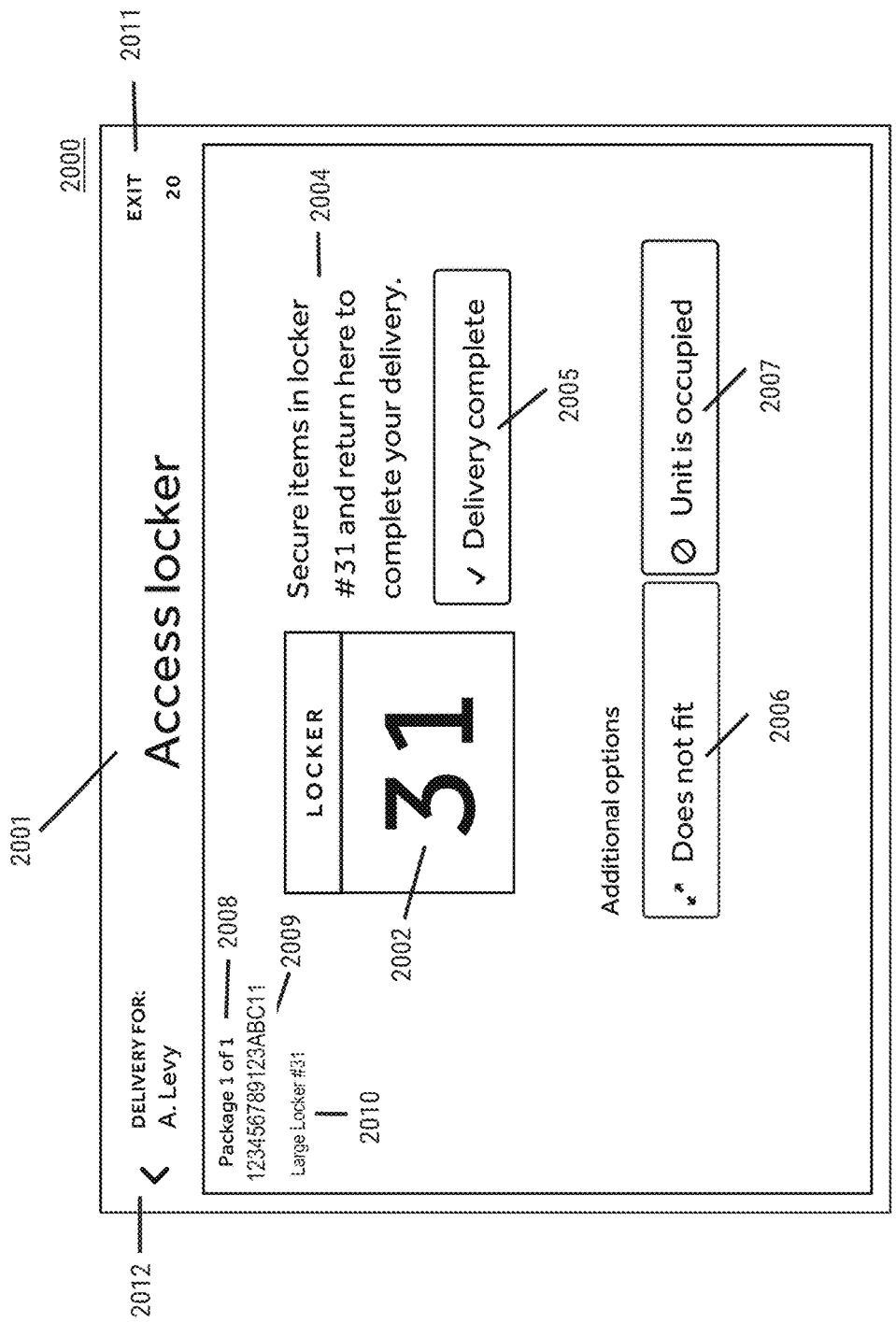
FIG. 20 is a screenshot of an example of a page that displays the storage area number of the selected storage area for depositing the item.

FIG. 20 is a screenshot of an example of a page 2000 that displays the storage area number of the selected storage area for deposit the item. Page 2000 includes at least title 2001, locker identifier 2002, instruction 2004, status indicator 2005, does-not-fit option 2006, occupied option 2007, item number indicator 2008, tracking number 2009, locker size 2010, exit link 2011, and prior page link 2012. In other embodiments, page 2000 may not include all of the components listed and/or may include other components in addition to or instead of those listed above.

In at least one embodiment, page 2000 shows the identifier of the storage area selected by system 100 and includes a link for the delivery service 130 to confirm the delivery of the item to the storage area that was selected. In at least one embodiment, page 2000 also includes links for the delivery service 130 to change to another storage area. Title 2001 is text showing that a storage area can be accessed for dropping off the item. Locker identifier 2002 is text showing an identifier of a storage area to help the delivery service 130 to locate the storage area within which to place the item being delivered. In the example of FIG. 20, the storage area identifier is a number and the storage area is a locker. However in other embodiments the storage area may be a different type of storage area and the storage area identifier may include other symbols (e.g., letters) in addition to or instead of numbers. Instruction 2004 is text instructing the delivery service 130 to deposit the item and return to the screen and confirm completion of the delivery. Status indicator 2005 indicates the status of the delivery of the item (e.g., whether or not the delivery is complete) and is a link for confirming the delivery after the delivery service 130 drops off the item in the storage area. In an embodiment, prior to selecting status indicator 2005, status indicator does not contain a check mark to indicate that the delivery is not complete, yet. After selecting status indicator 2005, a check mark appears indicating that the delivery is complete. Does-not-fit option 2006 is a link for reselecting the size of the storage area in case the item does not fit into the previously selected storage area. In at least one embodiment, does-not-fit option 2006 redirects the delivery service 130 to page 1900 (FIG. 19) for the delivery service 130 to choose another size of storage area. Occupied option 2007 is a link, which if selected, requests the system 100 to choose another storage area of the same size. Delivery service 130 may select occupied option 2007, if the prior selected storage area is occupied and already in use by an item intended for another recipient. In at least one embodiment, since the records of system 100 previously incorrectly indicated that the occupied locker was not occupied, there may also be a page and/or fields within which the delivery person that indicated that the storage area was occupied may enter information about the item in the occupied storage area. In at least one embodiment, clicking occupied option 2007 sends a message to an administrative person of the storage bank 110 to check the storage area to see what item is left in the storage area that is not recorded by the system 100. Item number indicator 2008 shows the number (and/or which one) of items to be deposited in the storage area. Tracking number 2009 shows the tracking information of the item to be delivered. Locker size 2010 shows the identifier of a selected storage area and the size of the selected storage area. Exit link 2011 may be the same as the exit link 1407 as discussed in conjunction with FIG. 14. Prior page link 2012 is a link back to the page 1700.

Figure 21:
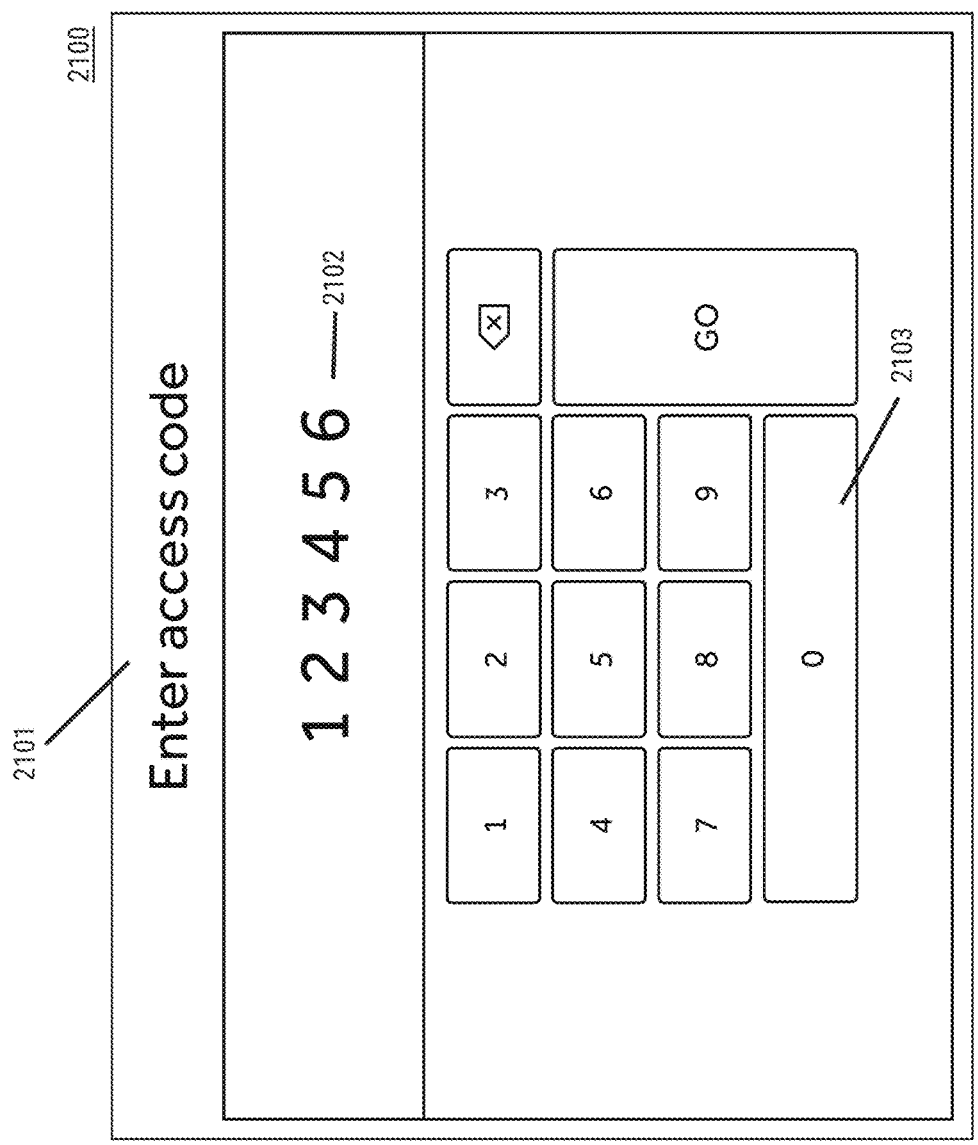
FIG. 21 is a screenshot of an example of a page for the intended recipient to enter a password in order to pick up an item.

FIG. 21 is a screenshot of an example of a page 2100 for intended recipient 150 to enter a password in order to pick up a item. Page 2100 includes at least title 2101, text field 2102, and keypad 2103, which are similar to instruction 1201, text field 1202, and keypad 1203 except that a password is entered by the intended recipient 150 to access the system 100 to pick up an item, whereas text field 1202 receives an access code entered by delivery service 130. In at least one embodiment, the password is generated by the server 120 and may expire after use or after a limited time. In at least one embodiment, after entering the password via page 2100, the password is authenticated by the server 120. In other embodiments, page 2100 may not include all of the components listed and/or may include other components in addition to or instead of those listed above.

Figure 22:
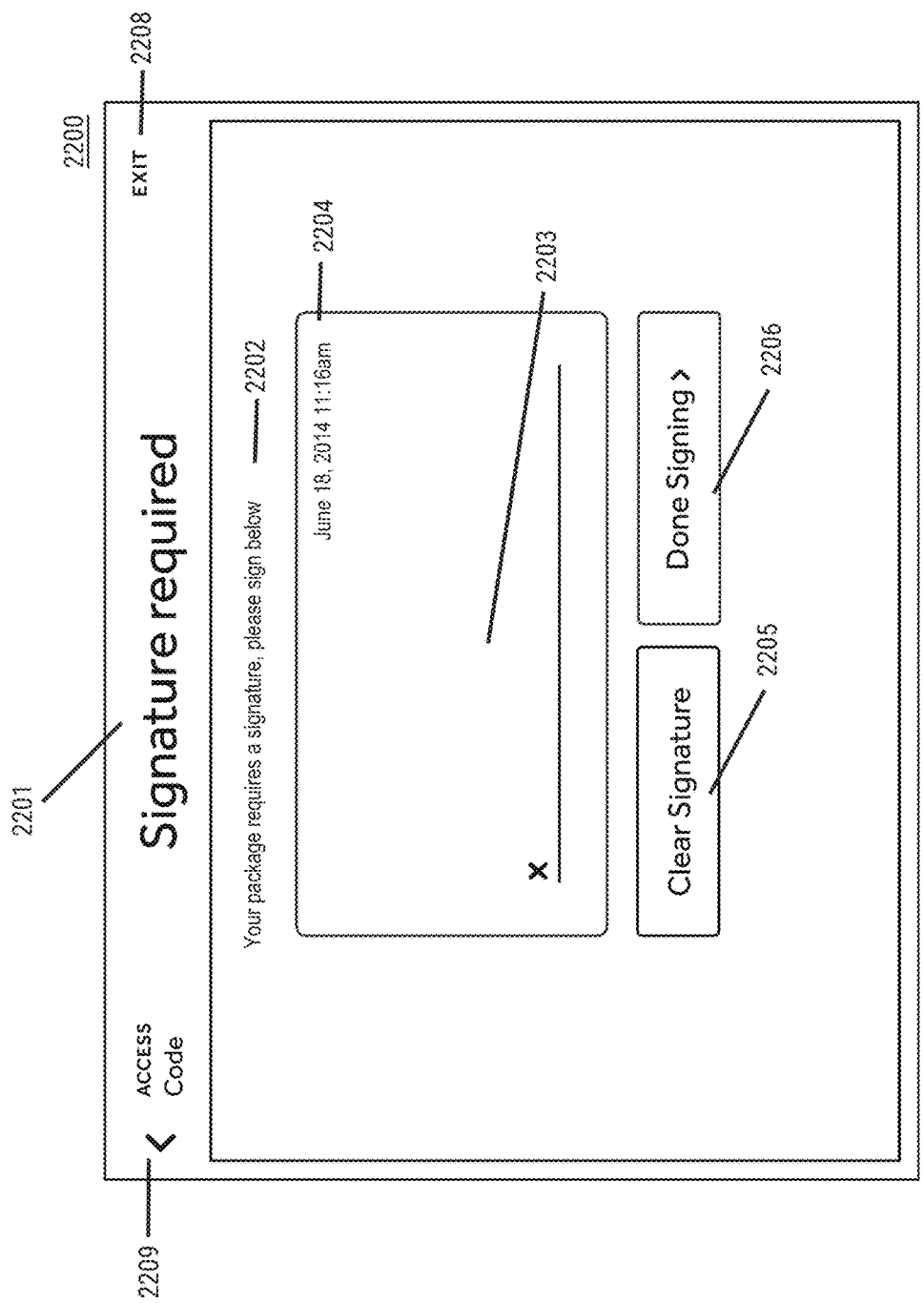
FIG. 22 is a screenshot of an example of a page for the intended recipient to sign in the case that the delivery service chooses that a signature of the recipient is required prior to opening the lock.

FIG. 22 is a screenshot of an example of a page 2200 for intended recipient 150 to sign if the delivery service 130 chooses that a signature of the recipient is required prior to opening the lock. Page 2200 includes at least instruction 2201, instruction 2202, signature field 2203, time indicator 2204, links 2205 and 2206, exit link 2208, and prior page link 2209. In other embodiments, page 2200 may not include all of the components listed and/or may include other components in addition to or instead of those listed above.

In at least one embodiment, page 2200 includes a field for the intended recipient 150 to sign (if required by the delivery service 130) before the system 100 opens the lock of the storage area. Instruction 2201 includes text indicating that a signature is required for picking up the item. Instruction 2202 includes text instructing the recipient to sign below (in the signature field). Signature field 2203 is a section having a field for the intended recipient 150 to sign. In the example of FIG. 22, signature field 2203 is placed (on page 2200) in an area surrounded by lines that circumscribe and/or outline the signature field 2203. Using touch screen, the recipient may sign within signature field 2203. In the example of FIG. 22, signature field 2203 is in a signature box. Time indicator 2204 displays and records the time when the signature is entered. Clear signature link 2205 is a link for clearing the signature so that a new signature may be entered (e.g., if the recipient made a mistake in the signature). Done signing link 2205 is a link for confirming completion of the signature, and by selecting done signing link 2205, the recipient indicates that the signature is complete. In at least one embodiment, as a result of selecting done signing link 2205, the signature is uploaded to the server 120 or stored by storage system 115 for authentication before the lock is opened, and the lock is only opened if the signature is determined to be authentic. In another embodiment, selecting done signing link 2205 causes the signature to upload to server 120 or stored at storage system 115, but the signature is not typically authenticated. By selecting done signing link 2205 may trigger storage system 115 or server 120 to store the signature in association with information about the item delivered. Exit link 2208 may be the same as the exit link 1407 as discussed in conjunction with FIG. 14. Prior page link 2209 is a link back to the page 2100.

Figure 23:
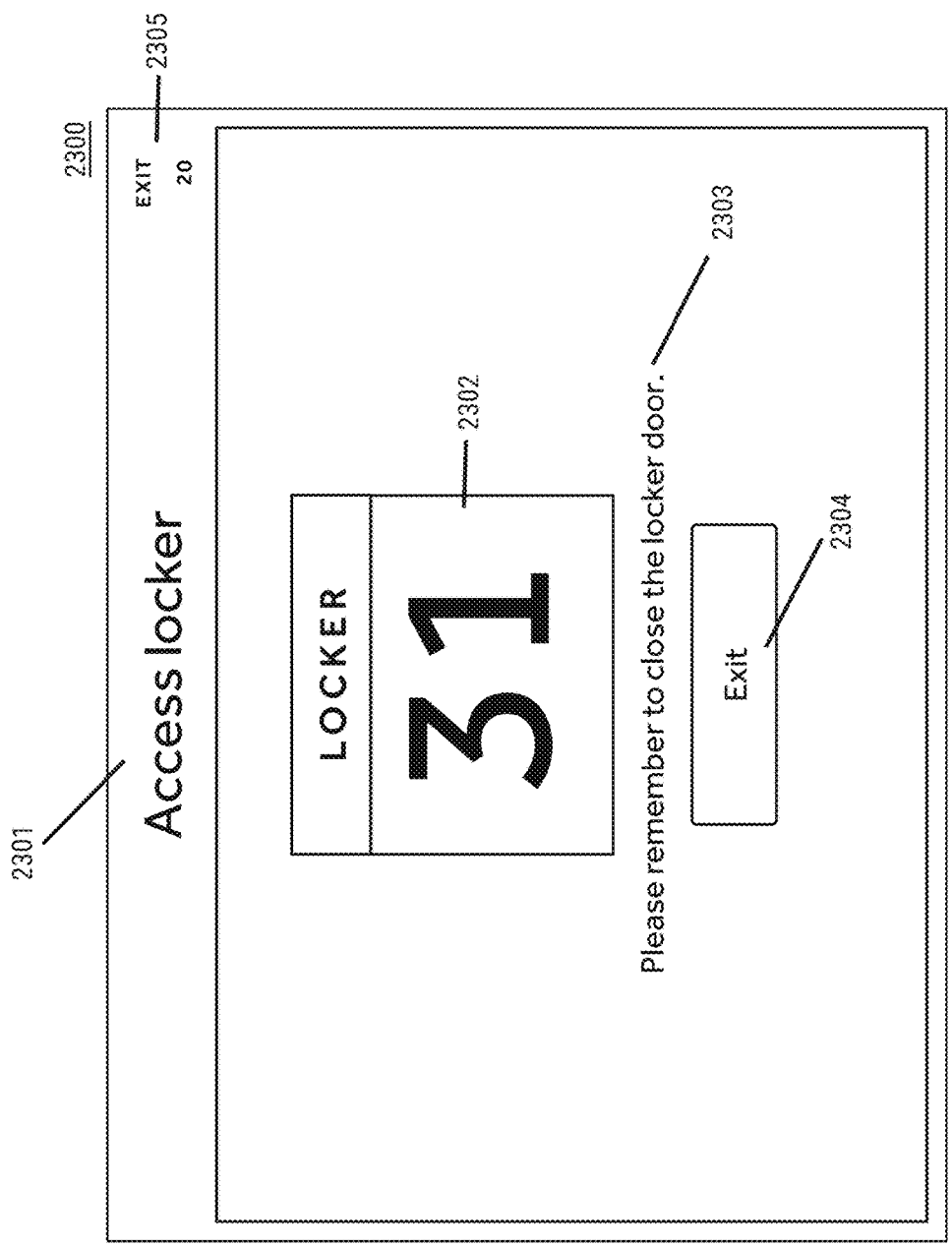
FIG. 23 is a screenshot of an example of a page that displays the identifier of a storage area that has an item for the recipient.

FIG. 23 is a screenshot of an example of a page 2300 that displays the identifier of a storage area for intended recipient 150 to pick up the item. Page 2300 includes at least instruction 2301, storage area identifier 2302, instruction 2303, exit link 2304, and exit link 2305. In other embodiments, page 2300 may not include all of the components listed and/or may include other components in addition to or instead of those listed above.

Instruction 2301 is text showing the storage area can be accessed to pick up the item. Storage area identifier 2302 includes the identifier of a storage area (e.g., a number identifying the storage area) where the item is stored. Instruction 2303 includes instructions for the intended recipient 150 to close the door after picking up the item. Exit link 2304 is a link to exit the system 100. Exit link 2305 may be the same as the exit link 1407 as discussed in conjunction with FIG. 14.

Extensions and Alternatives

Optionally, the storage areas may include sensors and/or cameras that detect whether or not a storage area is occupied, which may be capable to sense information about the contents of the storage area, such as by sensing the weight of the contents of the storage area and/or by photographing the contents of the storage area (e.g., so that the mailing label can be read). If a system 100 indicates that a storage area is empty and then the delivery service 130 selects occupied option 2007 (FIG. 20) indicating that the storage area is really occupied, contents of the storage may be photographed (or otherwise detected) to determine the intended recipient, to determine the sender, and/or to determine what action to take. Based on information detected about the item and based on prior records, of deliveries of items to that storage area, system 100 may be able to determine how long the item was in the storage area and/or whether the intended recipient attempted to pick up the item. Depending on whether the sender can be determined, depending on whether or not there was prior attempt to pick up the item from the storage area, and/or depending on how long ago the item was delivered, a determination may be made as to whether to return the item to the sender, to send a message to the intended recipient to pick up the item, to send a message to an administrative person to contact the intended recipient to determine what the issue may have been hindering the picking up the item, and/or whether to take other actions.

In an embodiment, intended recipient 150 may also drop off items in the storage areas for delivery service 130 or another recipient to pickup and deliver. Storage terminal 115 and/or sever 120 may include pages having fields in which the sender requests a storage area, enters information about the intended recipient, and optionally selects a delivery service. After the item is in the system 100, a message may be sent to the intended recipient to pick up the item directly or a message may be sent to a delivery service to pick up the item and deliver the item to the intended recipient.

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A method of using a storage system comprising:
photographing, by a camera of the storage system, a label on an article for an intended recipient, creating a legible image of the label;
automatically storing, via a machine of the storage system, in association with the photographing, at least information about an address of the intended recipient based on the image, the machine including at least
a computer storage system, the machine including at least
a processor system having at least one processor and
a computer storage system, the camera being associated with the machine and being communicatively linked to the machine; and
receiving the article in a given physical storage area of a set of physical storage areas of the storage system, wherein the storing of the information about the address occurs automatically in response to the photographing of the label.

2. The method of claim 1, wherein
the image of the label includes an image of at least a portion of the article.

3. The method of claim 1, wherein
the image of the label includes at least a name, an address, a phone number, and an email address of the intended recipient.

4. The method of claim 3, further comprising:
comparing, automatically by the machine, at least one piece of information from the label with information about a plurality of potential recipients; and
selecting, automatically by the machine, one of the plurality of potential recipients, the at least one piece of information from the label matching at least one piece of information about the one of the plurality of potential recipients.

5. The method of claim 1, wherein
the set of physical storage areas includes a set of lockers in a bank of lockers, different lockers of the set of lockers being associated with different intended recipients.

6. The method of claim 1, further comprising:
locking, by one of a plurality of locks, the given physical storage area after receiving the article in the given physical storage area.

7. The method of claim 6, the set of physical storage areas being a locker bank having a plurality of lockers, the method further comprising:
authenticating, by the machine, a user to determine whether the user is authorized to access the locker bank by checking a password; and
if the authenticating determines that the user is authorized, automatically opening, by the machine, the one of the plurality of locks that locks the given physical storage area that received the article, a password, used during the authenticating, expires after the opening of the one of the plurality of locks.

8. The method of claim 1, further comprising:
receiving the article in a pre-designated space within a focal range of the camera before performing the photographing of the label of the article with the camera, and
automatically focusing the camera so that the label is legible.

9. The method of claim 1, further comprising:
determining, automatically by the machine, the intended recipient based on the information about the address.

10. The method of claim 9, wherein the determining of the intended recipient further comprises:
   automatically, by the machine, identifying at least one piece of information from the image of the label;
   automatically, by the machine, searching for the at least one piece of information in a database; and
   automatically, by the machine, locating the intended recipient based on the searching.

11. The method of claim 9, further comprising:
   automatically extracting from the image of the label, letters and numbers that make up the information about the address of the intended recipient, wherein a mailing address is being read from the label.

12. The method of claim 1, wherein
   the camera automatically sends the image to the machine, the image including the legible image of the label.

13. The method of claim 1, further comprising:
   presenting the information about a street address of the intended recipient to a user; and
   presenting a page to the user having options for the user to choose the intended recipient.

14. The method of claim 13, further comprising:
   presenting a list of potential recipients to the user; wherein the presenting of the page to the user having the options for the user to choose the intended recipient, includes at least presenting options for the user to select the intended recipient from the list of potential recipients.

15. The method of claim 1, further comprising:
   presenting the information about the address of the intended recipient to a user; and
   presenting a page to the user having options for the user to create a listing for the intended recipient.

16. The method of claim 1, wherein the information about the address of the intended recipient is the image of the label.

17. The method of claim 1, the article being a package, the photographing of the article being performed without regard to contents of the package.

18. The method of claim 1, further comprising receiving information about an intended recipient, determining that the information does not match any entries on a stored list of possible recipients, and the photographing of the label being performed based on determining that the information does not matching the stored list of possible recipients.

19. The method of claim 1, further comprising scanning, by a scanner, information on the article for the intended recipient.

20. The method of claim 1, the article being a parcel package.

21. The method of claim 1, the image of the label includes at least a name of the intended recipient.

22. The method of claim 1, the image of the label includes at least the address of the intended recipient.

23. The method of claim 1, the image of the label includes at least a phone number of the intended recipient.

24. The method of claim 1, the image of the label includes an email address of the intended recipient.

25. The method of claim 1, the machine including a display, the method further comprising displaying a box on the display and an indication that the label of the box should appear in the box on the display prior to initiating the photographing.

26. A storage system comprising
   a camera mounted in a predetermined location for photographing a legible image of a label on an article for an intended recipient;
   a set of storage areas for storing the article after the article is photographed;
   a set of locks for locking the storage areas;
   a machine having a processor system including one or more processors and a memory system, the machine being communicatively coupled to the set of locks and the camera, the machine storing one or more machine instructions, which when implemented cause the machine to control whether to lock and unlock at least one lock of the set of locks and causes the machine to collect information about articles being delivered based on images from the camera.

27. The storage system of claim 26, wherein
   the label is on the article, wherein the image of the label includes an image of at least a portion of the article.

28. The storage system of claim 26, wherein
   the set of storage areas includes a set of lockers in a bank of lockers.

29. The storage system of claim 26, wherein the at least one lock of the set of locks automatically locks one storage area of the set of storage areas after the one storage area of the set of storage areas receives the article.

30. The storage system of claim 29, the one or more machine instructions including one or more instructions that cause the machine to authenticate a user, and if the user is authenticated, the one or more instructions cause the one of the at least one lock that locks the one storage area that receives the article to be automatically opened.

31. The storage system of claim 26, further comprising a pre-designated space within a focal range of the camera, the pre-designated space being a space for placing the article before the camera photographs the label of the article, and being a space where the article remains while being photographed.

32. The storage system of claim 26, wherein the machine includes one or more instructions for controlling the camera via a communicative coupling between the camera and the machine.

33. The storage system of claim 26, the machine storing one or more machine instructions, which when implemented, automatically unlock at least one of the storage areas for receiving the article even if an intended recipient could not be identified.

* * * * *